US012643354B2

(12) United States Patent
Kadnikov

(10) Patent No.: US 12,643,354 B2
(45) Date of Patent: Jun. 2, 2026

(54) INSTALLATION UNIT

(71) Applicant: ACPS Automotive GmbH, Ingersheim (DE)

(72) Inventor: Aleksej Kadnikov, Leonberg (DE)

(73) Assignee: ACPS Automotive GmbH (DE)

( * ) Notice: Subject to any disclaimer, the term of this patent is extended or adjusted under 35 U.S.C. 154(b) by 557 days.

(21) Appl. No.: 18/191,217

(22) Filed: Mar. 28, 2023

(65) Prior Publication Data

US 2023/0234413 A1 Jul. 27, 2023

Related U.S. Application Data

(63) Continuation of application No. PCT/EP2021/076232, filed on Sep. 23, 2021.

(30) Foreign Application Priority Data

Sep. 30, 2020 (DE) ..................... 10 2020 125 607.8

(51) Int. Cl.
*B60D 1/54* (2006.01)
(52) U.S. Cl.
CPC .......... *B60D 1/54* (2013.01); *B60D 2001/544* (2013.01)
(58) Field of Classification Search
CPC ........................... B60D 1/54; B60D 2001/544
See application file for complete search history.

(56) References Cited

U.S. PATENT DOCUMENTS

| | | | | |
|---|---|---|---|---|
| 11,577,563 B2 * | 2/2023 | Koenig | ................... | B60D 1/06 |
| 2015/0352915 A1 * | 12/2015 | Burkhardt | ............... | B60D 1/54 |
| | | | | 280/491.3 |
| 2016/0069923 A1 | 3/2016 | Shimizu et al. | | |

FOREIGN PATENT DOCUMENTS

| | | | |
|---|---|---|---|
| DE | 29800542 U1 | 3/1998 |
| DE | 29825216 U1 | 4/2006 |
| DE | 202007013022 U1 | 11/2007 |
| DE | 202006012577 U1 | 12/2007 |
| DE | 102014108071 A1 | 12/2015 |
| DE | 102017121369 A1 | 3/2019 |
| DE | 102019130312 A1 | 5/2021 |
| EP | 2952367 A1 | 12/2015 |
| EP | 3819138 A1 | 5/2021 |

* cited by examiner

*Primary Examiner* — Kevin Hurley
(74) *Attorney, Agent, or Firm* — Reinhart Boerner Van Deuren P.C.

(57) ABSTRACT

The invention relates to an installation unit for a carrier element of a carrier unit that is arranged on a body of a motor vehicle, comprising a housing having a first housing portion that, on a first outer side, is supported against a receiving region of the carrier element, and a second housing portion that engages in a receptacle in the receiving region of the carrier element, and a fixing unit that, when the installation unit is mounted in the receptacle, is supported against the receiving region, wherein, when the installation unit is fixed on the receiving region, the fixing unit is connected to the housing, in particular to the second housing portion.

26 Claims, 33 Drawing Sheets

INSTALLATION UNIT

CROSS-REFERENCE TO RELATED PATENT APPLICATIONS

This application is a continuation of international application number PCT/EP2021/076232 filed on Sep. 23, 2021 and claims the benefit of German application number 10 2020 125 607.8 filed on Sep. 30, 2020.

The present disclosure relates to the subject matter disclosed in international application number PCT/EP2021/076232 of Sep. 23, 2021 and German application number 10 2020 125 607.8 of Sep. 30, 2020, which are incorporated herein by reference in their entirety and for all purposes.

BACKGROUND OF THE INVENTION

The invention relates to an installation unit for a carrier element of a carrier unit, wherein the carrier element is arranged on a body of a motor vehicle, comprising a housing having a first housing portion that, on a first outer side, is supported against a receiving region of the carrier element, and a second housing portion that engages in a receptacle of the receiving region of the carrier element.

In installation units of this kind, the simplest possible installation in the receptacle of the carrier element is sought.

SUMMARY OF THE INVENTION

Such an installation that is as simple as possible can be produced if the installation unit has a fixing unit that, when the installation unit is fixed in a receiving region, is supported against the receiving region, wherein, when the installation unit is fixed on the receiving region, the fixing unit is connected to the housing, in particular to second housing portion.

In particular, an installation unit of this kind may comprise a plug socket for a trailer that is connectable to the motor vehicle, or a load carrier and/or a control unit for a component of the carrier unit and/or trailer or load carrier.

A solution of this kind can be implemented particularly simply and inexpensively.

In order to fix the housing to the receiving region in a defined manner, there is preferably arranged on the housing, in particular on the second housing portion, at least one projection which engages in a recess that is arranged in the receiving region, in particular the receptacle, and which fixes the housing on the receiving region such that it cannot rotate, with the result that an unambiguous orientation of the housing on the receiving region is predeterminable.

The at least one projection could theoretically be arranged at any desired location of the housing, in particular of the second housing portion.

It is particularly advantageous if the at least one projection is integrally formed on the second housing portion in a manner adjoining the first housing portion in order that the housing be fixed close to the first housing portion such that it cannot rotate.

It is even better if there is arranged on the housing, in particular on the second housing portion, a plurality of projections of which each engages in a recess arranged in the receiving region, in particular in the receptacle.

More detailed statements have not yet been made in the context of the explanation of the solution according to the invention as regards support of the fixing unit against the receiving region.

For example, a particularly advantageous solution provides for the housing, in particular the second housing portion thereof, to be supported against the receiving region by the fixing unit to prevent movement counter to the direction of pushing in.

It is particularly favorable if the fixing unit comprises a fixing element that is supported against a second outer side of the receiving region that is opposite to the first outer side.

In this case, the fixing element may be connected to the housing portion, in particular the second housing portion, in the most diverse ways.

An advantageous solution provides for the fixing element to comprise holding anchors, which extend between the second housing portion and an inner wall of the receiving channel of the receptacle and are fixable on bearing receptacles of the housing, in particular being fixed when the installation unit is fixed on the receiving region.

In particular in this case, it is provided for the holding anchors to be provided at the end with latching elements which, when the installation unit is in the fixed condition, engage in latching receptacles that are arranged in the respective bearing receptacle.

These latching receptacles are configured in particular to cooperate with the latching elements and at the same time to be fixable in a simple manner in different latching positions relative to one another in order to be able, in a simple manner, to compensate for installation tolerances in the receiving region that arise because the fixing element is to be arranged at slightly different spacings from the bearing receptacles as a result of these installation tolerances.

In the simplest case here, the fixing element is configured such that it comprises a seating body, which takes the form in particular of an annular body and is abuttable against the receiving region, in particular radially outside the second housing portion.

For the purpose of securely fixing the seating body, the seating body is provided with seating projections that are formed such that, in the mounted condition of the installation unit, they abut against the second outer side of the receiving region and are supported against the receiving region.

As an alternative to the provision of holding anchors, another preferred solution provides for the fixing unit for fixing the seating body to comprise screwing anchors that extend between the second housing portion and an inner wall of the receiving channel of the receptacle and, at the end, engage in bearing receptacles of the housing.

In this case, it is preferably provided for the screwing anchors to be configured to screw into screw receptacles arranged in the bearing receptacles of the housing.

More detailed statements have not yet been made as regards the bearing receptacles.

In principle, the bearing receptacles may for example be arranged on the first housing portion or for example also be integrated into this.

A particularly advantageous solution provides for the bearing receptacles to be arranged on the second housing portion.

It is particularly favorable if the at least one projection of the second housing portion is formed as one of the bearing receptacles, wherein it is particularly useful if each of the projections of the second housing portion at the same time takes the form of a bearing receptacle.

More detailed statements have not yet been made as regards the form taken by the seating body.

This could in principle extend over a surface running parallel to the second outer side.

An advantageous solution provides for the seating body to be convex in the direction of an access side of the second housing portion which is remote from the first housing portion, and for the holding anchors or screwing anchors in the regions of the seating body that are at the greatest spacing from the access side to act on the seating body.

This solution has the advantage that the seating body is thus necessarily also convex in the direction of the second outer side of the receiving region and hence abuts first against this outer side of the receiving region by means of the regions lying between the holding anchors or screwing anchors and, as a result of the increasing tension at the holding anchors or screwing anchors, is abuttable with bias against the outer side of the receiving region.

As an alternative or in addition to the solutions described above, a further advantageous solution of the object mentioned in the introduction provides for the fixing element to be provided with fixing tabs that are configured to be immobilized against a fixing portion of the second housing portion, such that very simple fixing of the fixing element against the second housing portion is consequently achievable.

This can be achieved in a particularly simple manner if, when the installation unit is fixed on the receiving region, the second housing portion projects beyond the second outer side of the receiving region by means of the fixing portion.

Moreover, the fixing element is preferably configured such that the fixing element has a flat region which extends approximately parallel to a plane running transversely to the center axis and carries fixing tabs that extend radially in relation to the center axis.

In this case, the flat region may take the most diverse forms.

An advantageous solution provides for the flat region, in the condition with the installation unit mounted on the receiving region, to abut against the second outer side such that the flat region at the same time forms the seating body.

So that in this case the fixing element may at the same time hold a cable feed in abutment against the carrier element, it is preferably provided for the fixing element to have a holding bracket that engages over a cable feed and in so doing can cause this likewise to abut against the carrier element.

A further alternative of the solution according to the invention of the object mentioned in the introduction provides for the fixing unit to comprise a bayonet closure and a fixing flange, by which the fixing flange is fixable on the second housing portion.

In this arrangement, the fixing flange is for example arranged on a closing-off cover for the second housing portion.

In this case too, it is preferably provided, when the installation unit is mounted on the receptacle, for the fixing flange to abut against the second outer side of the receiving region.

A further advantageous solution of the object that is mentioned in the introduction provides for the fixing unit to comprise fixing projections that are held on the second housing portion.

In this case, it is usefully possible, when the housing is in the condition installed on the receiving region, for it to be supported by the fixing projections against a step on the receiving region, in particular the receptacle.

This can be achieved in a particularly advantageous manner in that the fixing projections take a form such that they move automatically into a support position, in which they are supported with a support side against the step of the receiving region.

This can be achieved particularly simply in that the fixing projections are integrally formed in one piece with the second housing portion.

In particular, it is provided here for the fixing projections to extend in both a radial direction and/or a peripheral direction around the second housing portion.

In particular, it is usefully provided for the fixing projections to be movable by resilient deformation, at least in the radial direction relative to the second housing portion.

As an alternative or in addition, it is provided for the fixing projections to be movable by resilient deformation relative to the second housing portion, at least in a direction of a peripheral direction around the second housing portion.

A technically particularly favorable configuration provides for the fixing projections to be made in the form of blades that extend transversely to a step face of the step and are connected on their longitudinal side to the second housing portion.

In this context, it is particularly favorable if the blades have support edges that extend transversely to the longitudinal side and by which they are supported on the step face of the receiving region.

Moreover, it is preferably provided for the fixing projections to have inwardly pivotal edges that run transversely to the longitudinal side and that, on abutment against an inner wall of the receiving channel, deform the fixing projections in the radial direction and/or the peripheral direction in order to move the second housing portion with the fixing projections through the receiving channel from the first receiving side to the step of the receiving region, in particular within the receptacle.

When the fixing projections, in particular by means of the support edges, are in a defined position relative to the first housing portion, the problem would arise that there would be no compensation of tolerance between the step—in particular the step face thereof—and the first outer side of the receiving region, which predetermines the position of the first housing portion.

For this reason, an advantageous solution provides, where there is a multiplicity of fixing projections, for different ones of the fixing projections to be arranged with their support edges at different spacings from the first housing portion.

This provides the possibility that the multiplicity of fixing projections compensate for different tolerances between the step and the step face in that, when the installation unit is inserted, at least some of the fixing projections are able to expand radially on reaching the step and be supported on the step face by the support edge.

Another advantageous solution to the object mentioned in the introduction provides for the fixing unit to comprise a multiplicity of fixing tabs that are held on the second housing portion.

Preferably here, the fixing tabs are integrally formed in one piece with the second housing portion.

More detailed statements have not yet been made as regards the orientation of the fixing tabs.

For example, an advantageous solution provides for the fixing tabs to extend approximately parallel to the direction of pushing in and thus in particular also parallel to the center axis.

Further, it is preferably provided for the fixing tabs to be configured to be urged by a wedge body in the radial direction relative to a center axis of the second housing portion and thus to abut against the receiving region, in particular an inner wall of the receiving channel, and to be wedged thereby.

For this purpose, preferably the inner wall of the receiving channel is formed to widen in the abutment region of the fixing tabs, in particular widening conically in the direction of the second outer side.

A further advantageous solution provides for the wedge body to take the form of an annular body, in which case the wedge body need not necessarily be a closed annular body but may also be an open annular body.

In principle, the wedge body may be provided with sufficient inherent stability to be able to urge the fixing tabs radially outward in the direction of the receiving region, in particular in the direction of the inner wall of the receiving channel, to abut against this and to be wedged by the inner wall.

However, a particularly advantageous formation of the wedge body is possible if the wedge body is supported and guided on the housing on an opposite side to the fixing tabs, for example being guided on a closing-off cover of the housing, with the result that the wedge body need only have a limited inherent stability in order to urge the fixing tabs in the radial direction.

In order to fix the wedge body securely, it is preferably provided for latching elements to fix the wedge body in the position in which it urges the fixing tabs.

In this arrangement, the latching elements may either act between the wedge body and the fixing tabs or between the wedge body and the closing-off cover, where such a closing-off cover is provided and active.

Thus, the description above of solutions according to the invention comprises in particular the different combinations of features that are defined by the sequentially numbered embodiments below:

1. An installation unit for a carrier element (40) of a carrier unit (20) that is arranged on a body of a motor vehicle, comprising a housing (102) having a first housing portion (104) that, on a first outer side (74), is supported against a receiving region (60) of the carrier element (40), and a second housing portion (106) that engages in a receptacle (72) of the receiving region (60) of the carrier element (40), and a fixing unit (150, 170, 200, 220, 250, 300) that, when the installation unit (100) is mounted in the receptacle (72), is supported against the receiving region (60), wherein, when the installation unit (100) is fixed on the receiving region (60), the fixing unit (150, 170, 200, 220, 250, 300) is connected to the housing (102), in particular to the second housing portion (106).

2. The installation unit according to embodiment 1, wherein there is arranged on the housing (102), in particular on the second housing portion (106), at least one projection (122) which engages in a recess (124) that is arranged in the receiving region (60), and which fixes the housing (102) in the receptacle (72) such that it cannot rotate.

3. The installation unit according to embodiment 1 or 2, wherein the at least one projection (122) is integrally formed on the second housing portion (106) in a manner adjoining the first housing portion (104).

4. The installation unit according to embodiment 2 or 3, wherein there is arranged on the housing (102), in particular on the second housing portion (106), a plurality of projections (122) of which each engages in a recess (124) arranged in the receiving region (60).

5. The installation unit according to one of the preceding embodiments, wherein the housing (102) is supported against the receiving region (60) by the fixing unit (150, 170, 200, 220, 250, 300) to prevent movement counter to the direction of pushing in (142).

6. The installation unit according to embodiment 5, wherein the fixing unit comprises a fixing element (150, 170, 200, 220) that is supported against a second outer side (76) of the receiving region (60) that is opposite to the first outer side (74).

7. The installation unit according to embodiment 6, wherein the fixing element (150, 170) comprises holding anchors (156), which extend between the second housing portion (106) and an inner wall (84) of the receiving channel (82) of the receptacle (72) and are fixable on bearing receptacles (122) of the housing (102), in particular being fixed when the installation unit (100) is fixed on the receiving region (60).

8. The installation unit according to embodiment 7, wherein the holding anchors (156) are provided at the end with latching elements (158) which, when the installation unit (100) is in the fixed condition, engage in latching receptacles (162) that are arranged in the respective bearing receptacle (122).

9. The installation unit according to one of the preceding embodiments, wherein the fixing element (150) comprises a seating body (152), which takes the form in particular of an annular body.

10. The installation unit according to embodiment 9, wherein the seating body (152) is provided with seating projections (154) that are formed such that, in the fixed condition of the installation unit (100), they abut against the second outer side (76) of the receiving region (60) and are supported against the receiving region (60).

11. The installation unit according to one of the preceding embodiments, wherein the fixing unit (170) for fixing the seating body (172) comprises screwing anchors (176) that extend between the second housing portion (106) and an inner wall (84) of the receiving channel (82) of the receptacle (72) and, at the end, engage in bearing receptacles (122) of the housing (102).

12. The installation unit according to embodiment 11, wherein the screwing anchors (176) are configured to screw into screw receptacles (178) arranged in the bearing receptacles (122) of the housing (102).

13. The installation unit according to one of the preceding embodiments, wherein the bearing receptacles (122) are arranged on the second housing portion (106).

14. The installation unit according to one of the preceding embodiments, wherein the at least one projection (122) is formed as one of the bearing receptacles.

15. The installation unit according to one of embodiments 3 to 14, wherein the seating body (152, 172) is convex in the direction of the access side (130) of the second housing portion (106), and wherein the holding anchors (156) or screwing anchors (176) in the regions of the seating body (152, 172) that are at the greatest spacing from the access side (130) act on the seating body (152, 172).

16. The installation unit according to one of the preceding embodiments, wherein the fixing element (202) is provided with fixing tabs (208) that are configured to be immobilized against a fixing portion (192) of the second housing portion (106).

17. The installation unit according to embodiment 16, wherein, when the installation unit (100) is fixed on the receiving region (60), the second housing portion (106) projects beyond the second outer side (76) of the receiving region (60) with the fixing portion (192).

18. The installation unit according to embodiment 16 or 17, wherein the fixing element (202) has a flat region (204) which extends approximately parallel to a plane running transversely to the center axis (78) and carries fixing tabs (208) that extend radially in relation to the center axis (78).

19. The installation unit according to embodiment 18, wherein the flat region (204), in the condition with the installation unit (100) fixed on the receiving region (60), abuts against the second outer side (76).

20. The installation unit according to one of the preceding embodiments, wherein the fixing element (202) has a holding bracket (216) that engages over a cable feed (138).

21. The installation unit according to one of the preceding embodiments, wherein the fixing unit (220) comprises a bayonet closure (221) and a fixing flange (234), by which the fixing flange (234) is fixable on the second housing portion (106).

22. The installation unit according to embodiment 21, wherein the fixing flange (234) is arranged on a closing-off cover (132) for the second housing portion (106).

23. The installation unit according to embodiment 21 or 22, wherein, when the installation unit (100) is mounted on the receptacle (72), the fixing flange (234) abuts against the second outer side (76) of the receiving region (60).

24. The installation unit according to one of the preceding embodiments, wherein the fixing unit (230) comprises fixing projections (252) that are held on the second housing portion (106).

25. The installation unit according to embodiment 24, wherein, when the housing (102) is in the condition fixed on the receiving region (60), it is supported by the fixing projections (252) against a step (242) on the receiving region (60), in particular in the receiving channel (82) of the receptacle (72).

26. The installation unit according to embodiment 25, wherein the fixing projections (252) take a form such that they move automatically into a support position, in which they are supported with a support side (258) against the step (242) of the receiving region (60).

27. The installation unit according to embodiment 25 or 26, wherein the fixing projections (252) are integrally formed in one piece with the second housing portion (106).

28. The installation unit according to one of embodiments 24 to 27, wherein the fixing projections (252) extend in both a radial direction (254) and/or a peripheral direction (256) around the second housing portion (106).

29. The installation unit according to one of embodiments 24 to 28, wherein the fixing projections (252) are movable by resilient deformation, at least in the radial direction (254) relative to the second housing portion (106).

30. The installation unit according to one of embodiments 24 to 29, wherein the fixing projections (252) are movable by resilient deformation relative to the second housing portion (106), at least in a direction of a peripheral direction (256) around the second housing portion (106).

31. The installation unit according to one of embodiments 24 to 30, wherein the fixing projections (252) are made in the form of blades (251) that extend transversely to a step face (244) of the step (242) and are connected on their longitudinal side (253) to the second housing portion (106).

32. The installation unit according to embodiment 31, wherein the blades (251) have support edges (258) that extend transversely to the longitudinal side (253) and by which they are supported on the step face (244) of the receiving region (60).

33. The installation unit according to one of embodiments 24 to 32, wherein the fixing projections (252) have inwardly pivotal edges (262) that run transversely to the longitudinal side (253) and that, on abutment against an inner wall (84) of the receiving channel (82), deform the fixing projections (252) in the radial direction (254) and/or the peripheral direction (256) in order to move the second housing portion (106) with the fixing projections (252) through the receiving channel (82) from the first receiving side (74) to the step (242) of the receiving region (60).

34. The installation unit according to one of embodiments 24 to 33, wherein, where there is a multiplicity of fixing projections (252), different ones of the fixing projections (252) are arranged with their support edges (258) at different spacings from the first housing portion (104).

35. The installation unit according to one of the preceding embodiments, wherein the fixing unit (270) comprises a multiplicity of fixing tabs (272) that are held on the second housing portion (106).

36. The installation unit according to embodiment 35, wherein the fixing tabs (272) are integrally formed in one piece with the second housing portion (106).

37. The installation unit according to embodiment 35 or 36, wherein the fixing tabs (272) extend approximately parallel to the direction of pushing in (142).

38. The installation unit according to one of embodiments 35 to 37, wherein the fixing tabs (272) are configured to be urged by a wedge body (302) in the radial direction relative to a center axis (78) of the second housing portion (106) and thus to abut against the receiving region (60), in particular an inner wall (84) of the receiving channel (82), and to be wedged thereby.

39. The installation unit according to embodiment 38, wherein the wedge body (302) takes the form of an annular body.

40. The installation unit according to embodiment 38 or 39, wherein the wedge body (302) is supported and guided on the housing (102), in particular on a closing-off cover (132''') of the housing (102).

41. The installation unit according to one of embodiments 38 to 40, wherein latching elements (312, 314) fix the wedge body (302) in the position in which it urges the fixing tabs (272).

Further features and advantages of the invention form the subject matter of the description below, and the illustration in the drawing of some exemplary embodiments.

DETAILED DESCRIPTION OF THE INVENTION

Figure 1:
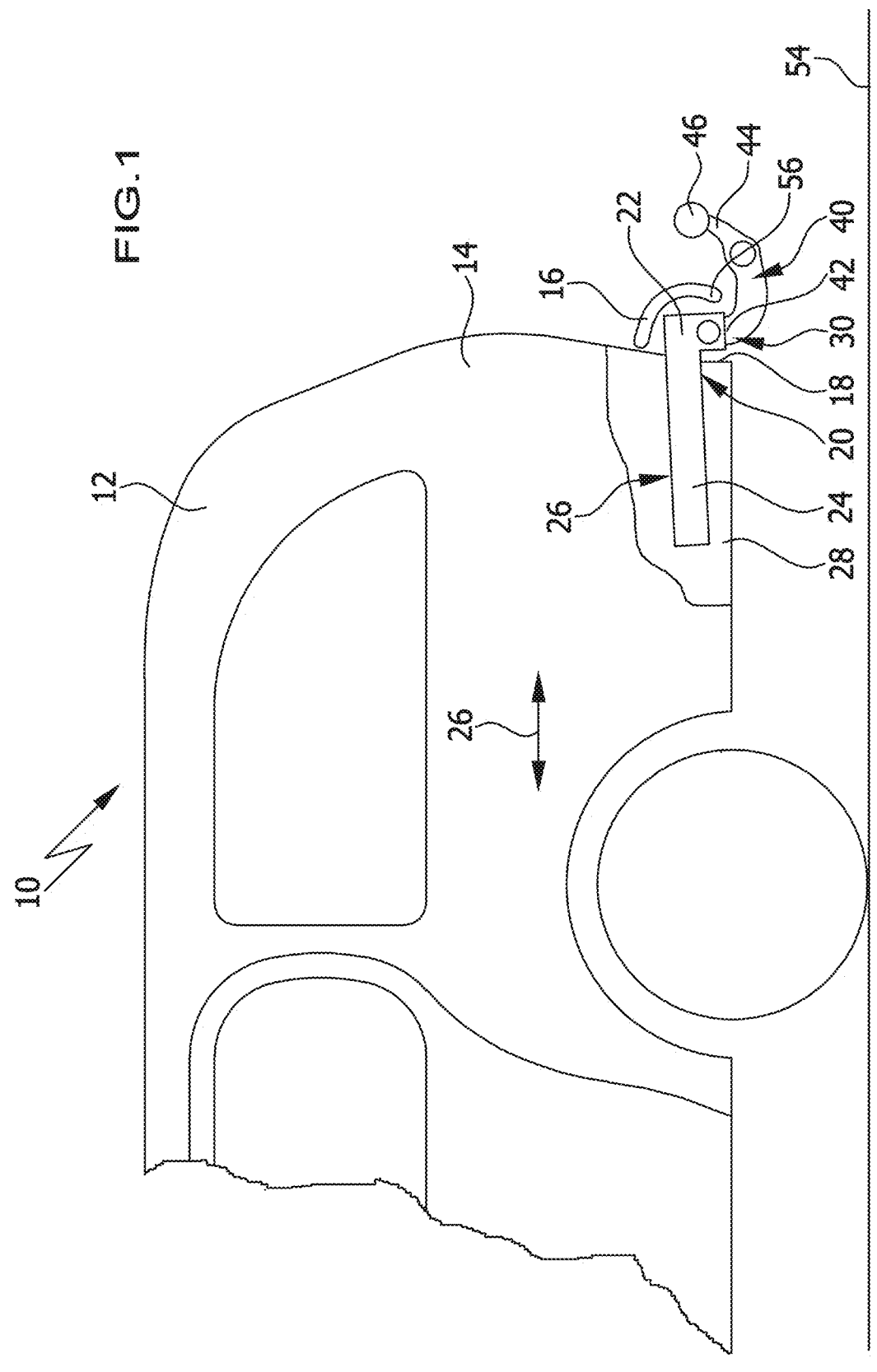
FIG. 1 shows a side view of a motor vehicle having a carrier unit comprising a carrier element, which takes the form for example of a ball neck.

A motor vehicle that is illustrated in FIG. 1 and is designated 10 as a whole comprises a body 12, which carries a bumper unit 16 on a tail region 14.

On a rear side 18 of the tail region 14, this rear side 18 being covered by the bumper unit 16, there is provided a transverse carrier 22 of a carrier unit that is designated 20 as a whole, wherein the transverse carrier 22 is fixed on the tail region 14 of the body 12 by lateral carriers 24—for example being fixed in that the lateral carriers 24 extend parallel to a longitudinal direction 26 of the body 12 and are fixed on the tail region 14 in side regions 28 thereof.

In this arrangement, the transverse carrier 22 is arranged between the rear side 18 of the tail region 14 and the bumper unit 16, and is covered by the bumper unit 16.

Figure 2:
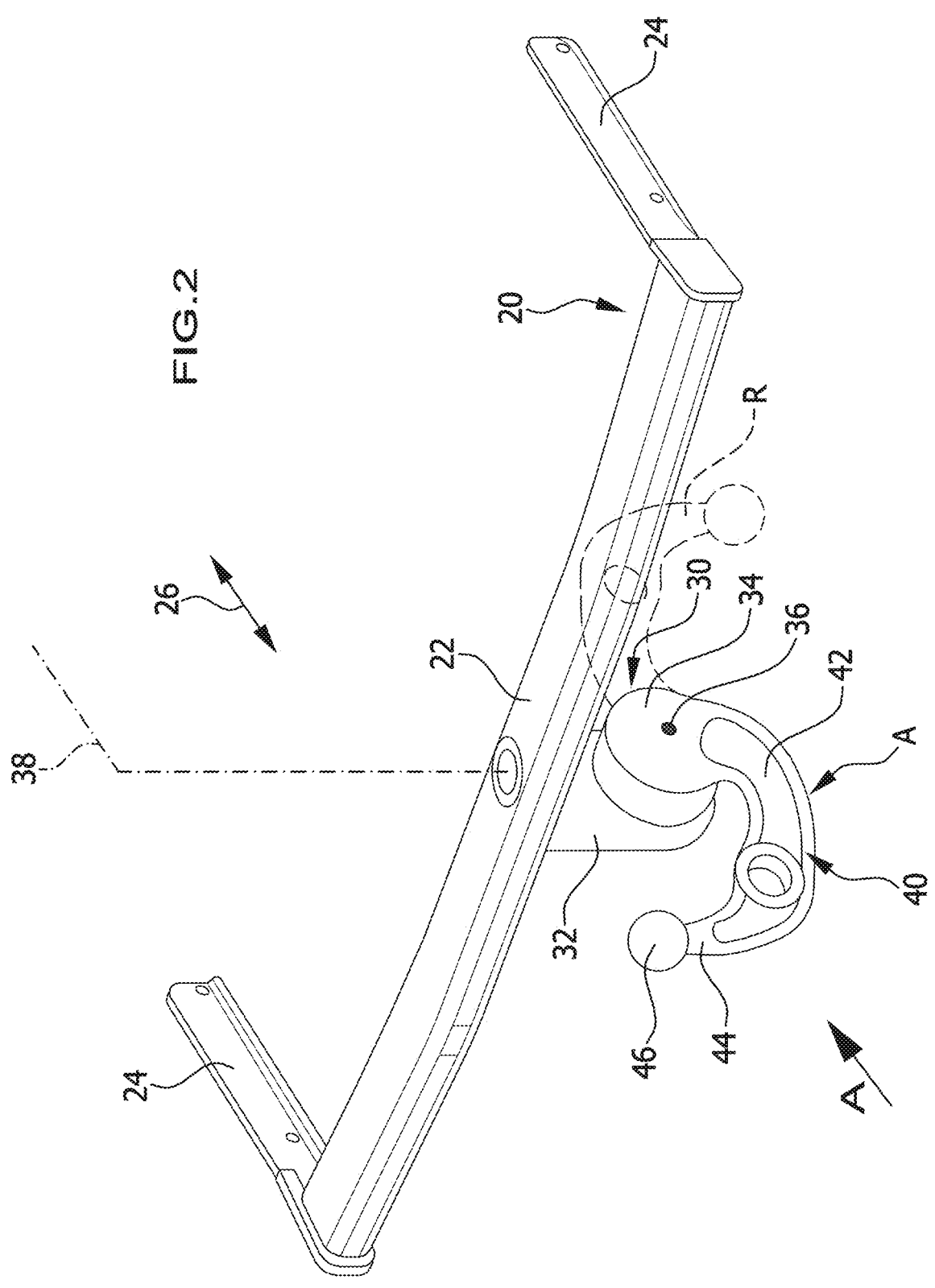
FIG. 2 is a perspective illustration of the carrier unit according to the invention from FIG. 1.

Further, the carrier unit 20 is provided with a bearing unit that is designated 30 as a whole and the bearing base 32 of which is connected to the transverse carrier 22, as illustrated in FIG. 2.

Further, the bearing unit 30 comprises a bearing element that is designated 34 as a whole and is connected to a first end 42 of a carrier element, which is designated 40 as a whole and which the carrier unit 20 likewise comprises, and which in particular takes the form of a ball neck and extends from the first end 42 to a second end 44 and carries at its second end 44 a coupling element that is designated 46 as a whole and is thus carried by the carrier unit 20 and takes the form for example of a coupling ball.

The bearing element 34 may be a bearing element that is fixedly connected to the bearing base 32 or that is removably mountable on the bearing base 32.

As an alternative, however, in the solution illustrated in FIG. 2, the bearing element 34 may be a pivotal bearing element that is pivotal in relation to the bearing base 32 about a pivot axis designated 36, such that the coupling element 40 is pivotal from the operative position A illustrated in FIG. 2 by solid lines into a rest position R, which is illustrated by dashed lines and in which the carrier element 40 extends from the bearing base 32 transversely in relation to the longitudinal direction 26 of the motor vehicle body 12 and hence in particular longitudinally in relation to the transverse carrier 22.

As a result, in the rest position R illustrated by dashed lines, the carrier element 40 runs transversely in relation to a vertical longitudinal center plane 38 of the motor vehicle body 12 and also in relation to the carrier unit 20, with the vertical longitudinal center plane 38 thus also running parallel to the longitudinal direction 26.

Further, the pivot axis 36 also runs preferably transversely to the vertical longitudinal center plane 38 but inclined thereto, in particular in relation to the vertical longitudinal center plane, about an angle of less than 90°, wherein the angle is for example less than 70° or in particular more than 20°.

Figure 3:
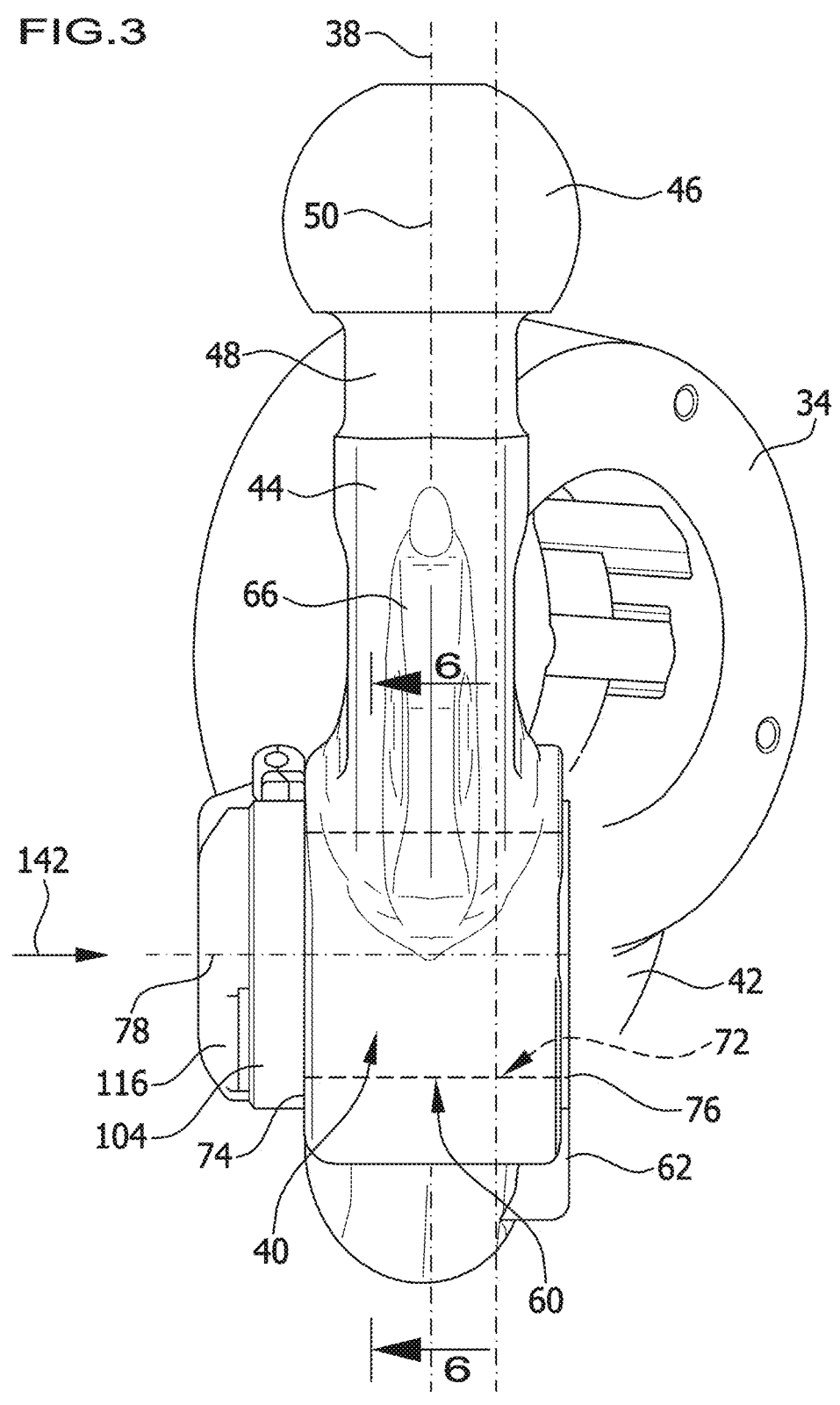
FIG. 3 shows a view of a carrier element of the carrier unit, in the direction of the arrow A in FIG. 2.

An exemplary embodiment of a carrier element 40 of this kind, in particular a ball neck, is illustrated on a larger scale in FIG. 3, wherein the carrier element 40 is in particular fixedly connected to the bearing element 34, preferably being integrally formed thereon, and the bearing element 34 in this case takes the form of a pivotal bearing element for pivotal bearing on the bearing base 32.

In the illustrated exemplary embodiment of the carrier element 40, it carries—in particular at its second end 44—a ball attachment 48, which has an outer face that runs cylindrically in relation to a ball center axis, at a radial spacing around a ball center axis 50 that is smaller than a radius of the coupling ball 46.

In the illustrated exemplary embodiment of the carrier element 40, it has—as illustrated in FIG. 3—a receiving region 60 that is integrated in one piece with the carrier element 40, that preferably takes the form of an annular body 62 and that lies between a first portion 64 extending from the first end 42 of the carrier element 40 to the annular body 62 and a second portion 66 extending from the annular body 62 to the second end 44 of the carrier element 40.

Figure 4:
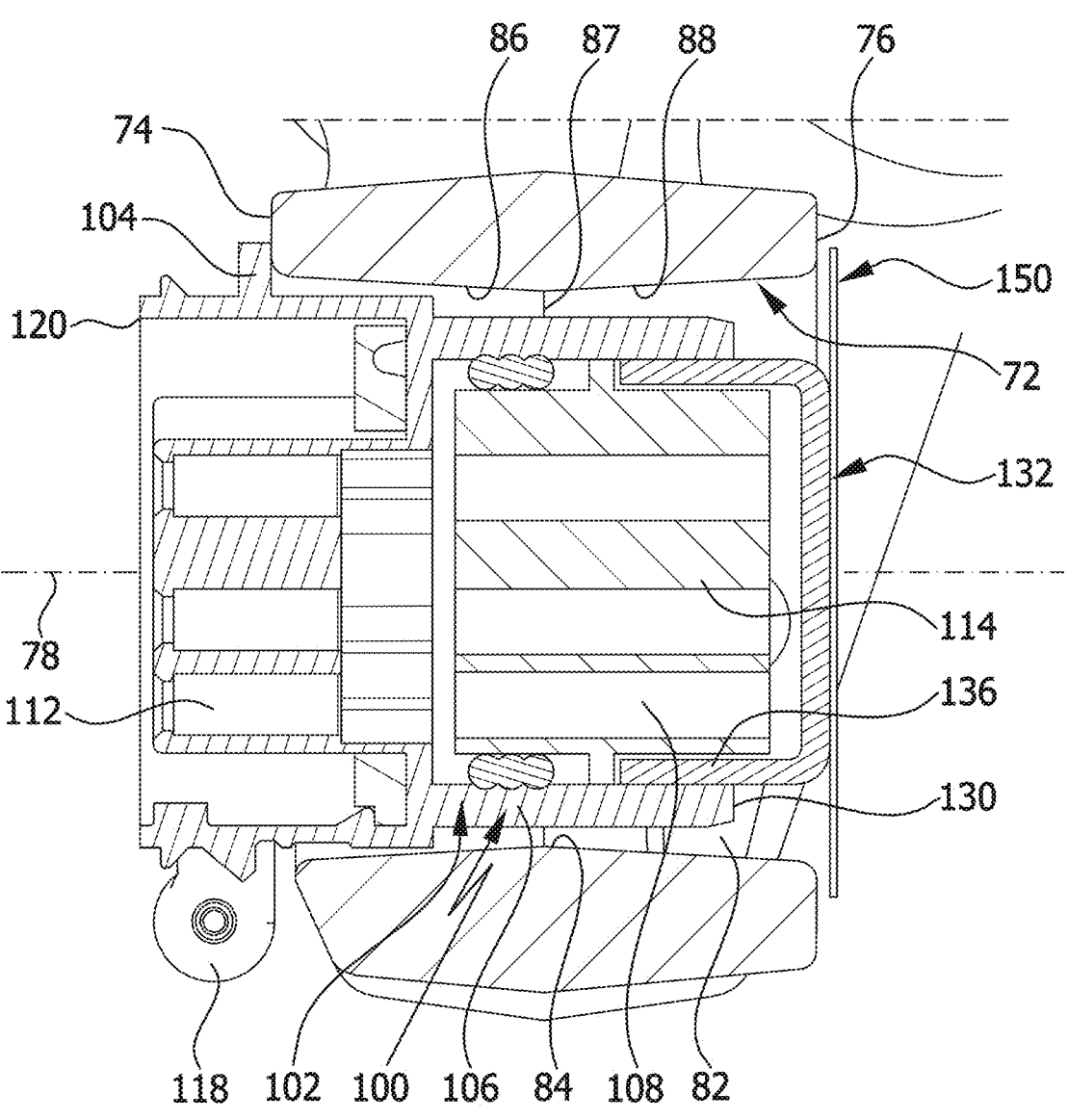
FIG. 4 shows a section along the line 4-4 in FIG. 9, through a first exemplary embodiment of an installation unit according to the invention mounted in a receptacle of the carrier element from FIG. 3.

The annular body 62 surrounds a receptacle that is designated 72 as a whole and extends, for example in the form of an aperture, from a first outer side 74 of the annular body 62 to a second outer side 76 of the receiving region 60 and forms for example a center axis 78 which runs transversely in relation to the vertical longitudinal center plane 38 and may be inclined, for example in relation to a normal to the vertical longitudinal center plane 38, by an acute angle, for example in the range from 5° to 30° (FIG. 3 and FIG. 4).

The receptacle 72 is formed in particular by a receiving channel 82 having an inner wall 84 that has, adjoining the first outer side 74 of the receiving region 60, a wall region 86 which runs substantially conically in relation to the center axis 78 and around the center axis 78 and which, starting from the outer side 74, narrows to a narrow point 87, and a wall region 88 which starts from the narrow point 87 and widens conically as far as the second outer side 76 and thus runs at a greater radial spacing from the center axis 78 at the transition to the second outer side 76 of the receiving region 60 than where it is close to the narrow point 87.

Received in the receptacle 72 is an installation unit that is designated 100 as a whole, that takes the form for example of a plug socket, and that is provided with a housing 102 having a first housing portion 104 that abuts against the first outer side 74 and is in particular supported thereby.

A second housing portion 106 extends from the first housing portion 104 and into the receiving channel 82 in the direction of the second outer side 76.

Preferably here, the second housing portion 106 is integrally formed in one piece with the first housing portion 104 such that they surround a housing interior 108 in which there are arranged for example a plug contact element 112 and a line connector element 114 combined therewith and/or also an electrical circuit, where appropriate also having sensors.

Plug contact elements 112 that are arranged for example in the housing interior 108 are made accessible for example by a cover 116 that closes off the first housing portion 104 and is pivotal by means of a hinge 118 in relation to the first housing portion 104 and is arranged on the first housing portion 104, on an opposite side to the second housing portion 106, in front of the first outer side 74, such that pivoting the cover 116 makes an opening 120 to the housing 102 accessible.

Figure 5:
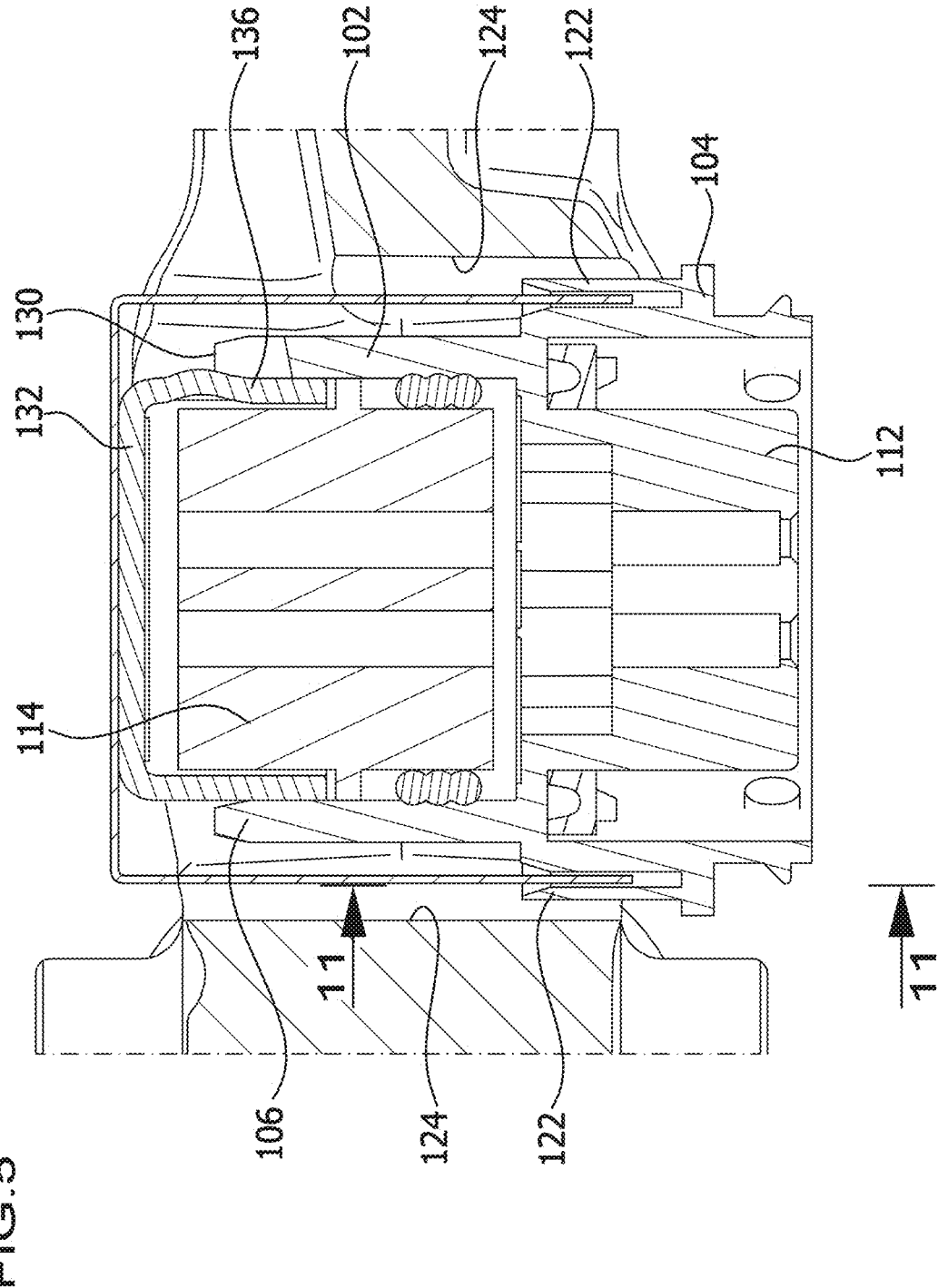
FIG. 5 shows a section along the line 5-5 in FIG. 6, through the first exemplary embodiment of the installation unit according to the invention.
Figure 6:
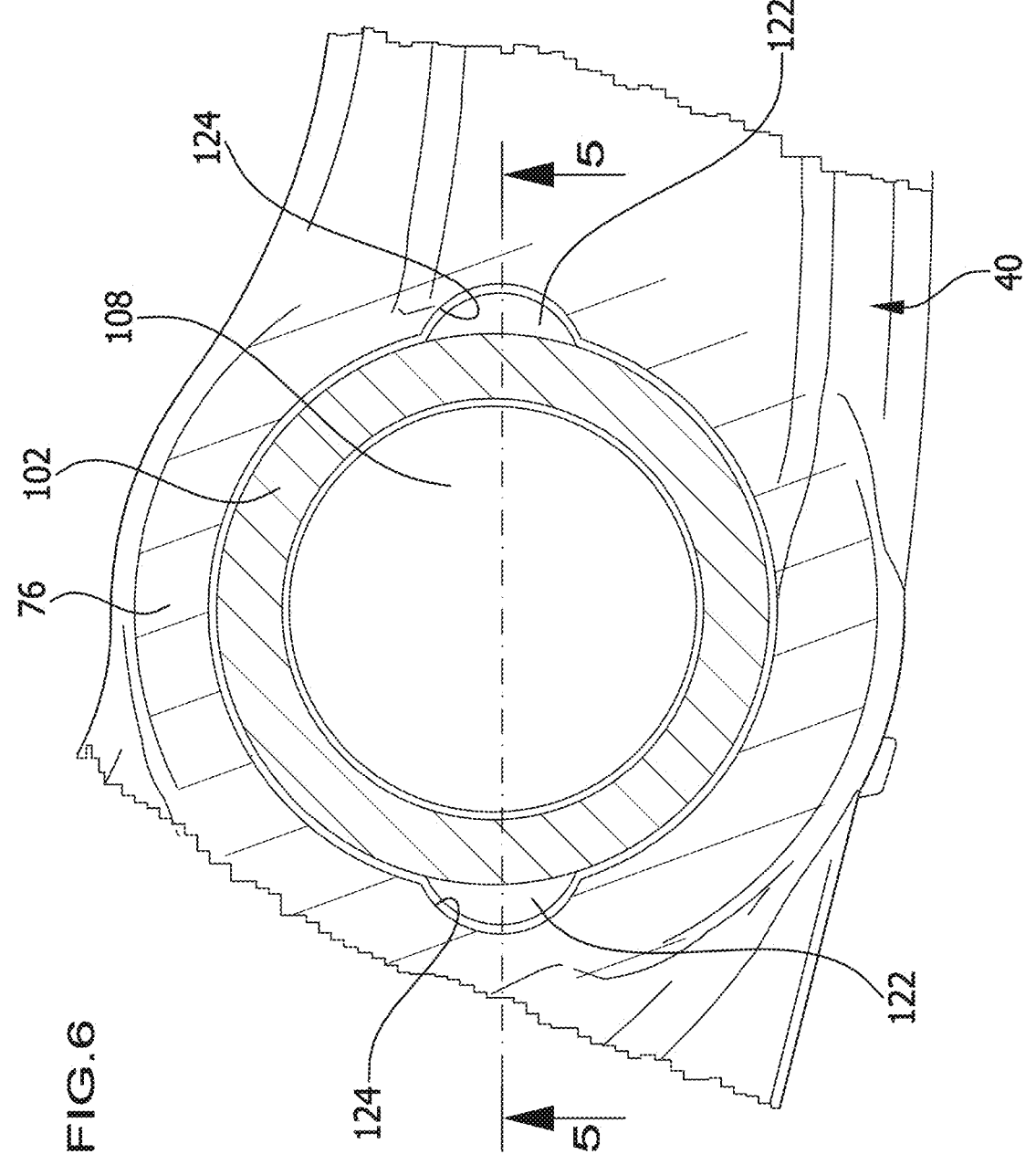
FIG. 6 shows a detail section along the line 6-6 in FIG. 3, through the first exemplary embodiment of the installation unit according to the invention.

For example—as illustrated in FIGS. 5 and 6—the second housing portion 106 takes a form such that the second housing portion 106 has, adjoining the first housing portion 104, at least one projection 122, preferably a respective projection 122 on opposite sides, wherein each of the projections 122 extends into a cutout 124 in the wall region 86 that extends radially in relation to the center axis 78, and wherein the cutout 124 is adapted to the shape of the respective projection 122 such that cooperation between the respective projection 122 and the corresponding cutout 124 fixes the housing 102 of the installation unit in the receptacle 72 such that it cannot rotate.

As a result, cooperation between the respective projection 122 and the corresponding cutout 124 produces an unambiguous orientation of the housing 102 of the installation unit 100 and thus also an unambiguous orientation of the cover 116 and for example the plug contact element 112.

Figure 7:
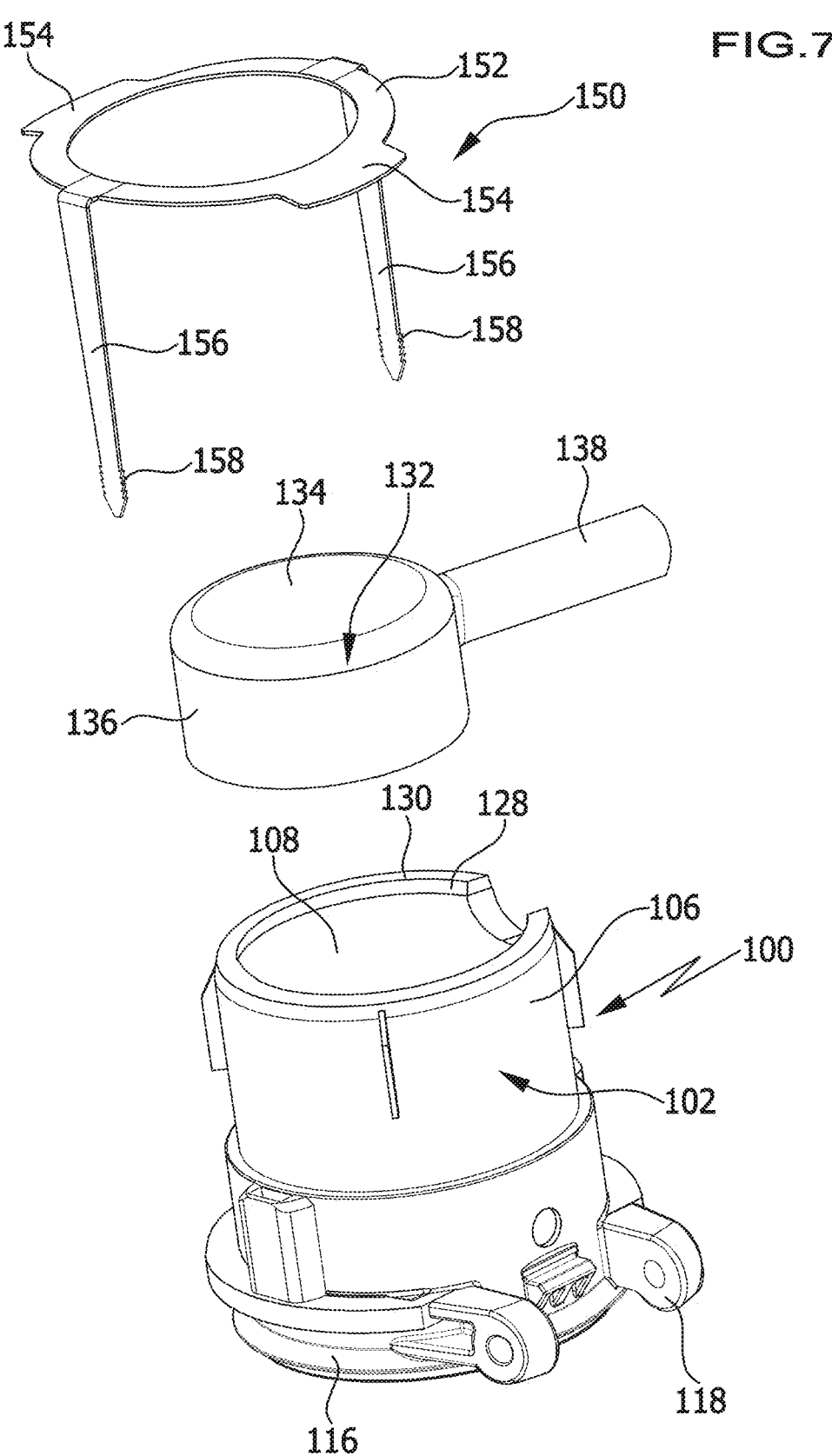
FIG. 7 shows a perspective exploded illustration of the first exemplary embodiment of the installation unit according to the invention.

As moreover illustrated in FIG. 7, the housing 102 is provided on its access side 130 remote from the first housing portion 104 with an access opening 128 that is closable by a closing-off cover that is designated 132 as a whole, wherein the closing-off cover 132 has a closure wall 134 and a cylindrical attachment 136 that extends from the closure wall 134 and is configured to be introduced into the housing interior 108 through the access opening 128, in order to achieve a sealing closure between the second housing portion 106 and the cover 132.

Further, the closing-off cover 132 is also provided with a cable feed 138 that is sleeve-like in form and through which an infeed cable can be introduced into the housing interior 108 when the closing-off cover 132 is placed on the second housing portion 106.

Figure 8:
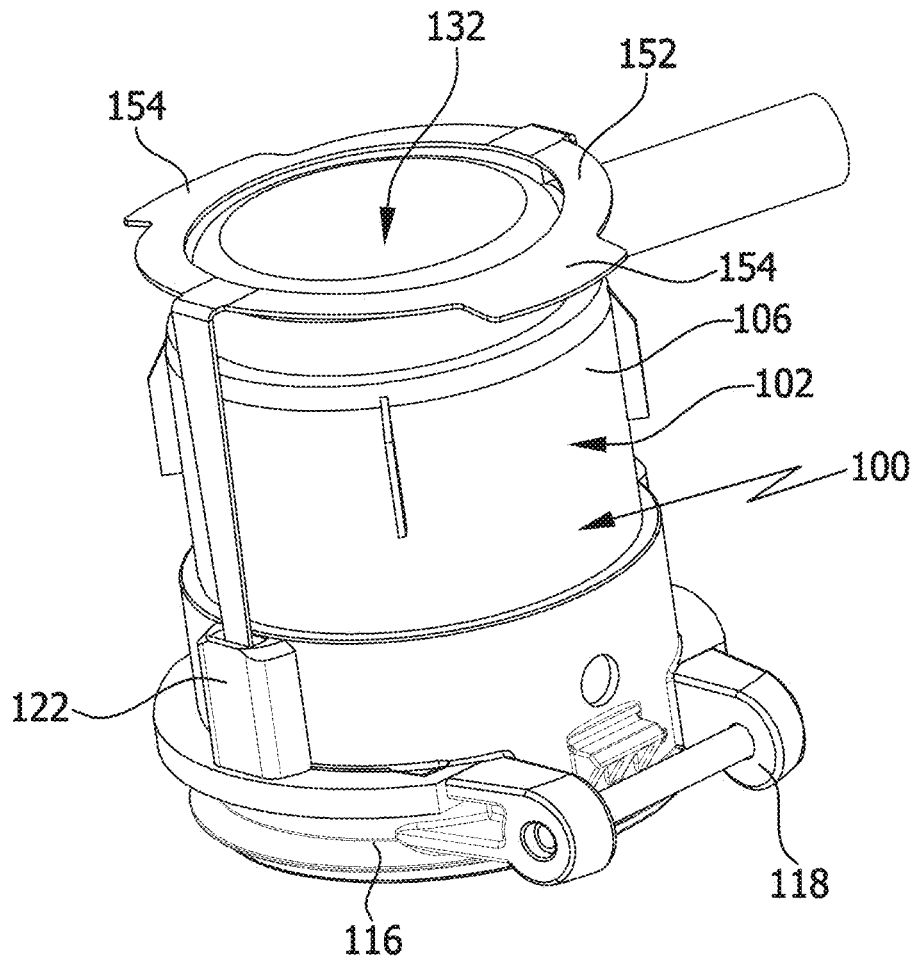
FIG. 8 shows a perspective illustration of the first exemplary embodiment of the installation unit according to the invention, in the assembled condition.

As illustrated in FIG. 8, the closing-off cover 132 thus closes off the housing interior 108 at an opposite side to the cover 116, wherein—as illustrated in FIG. 5—the cylindrical attachment 136 is connectable to walls of the second housing portion 106 in a manner providing sealing closure.

For the purpose of fixing the housing 102 in the receptacle 72, and as indicated in FIG. 3, the housing 102, with the second housing portion 106, is pushed into the receptacle, which is designated 72 as a whole, in a direction of pushing in 142, preferably parallel to the center axis 78, until the housing 102 abuts by means of the first housing portion 104 against the first outer side 74 of the receiving region 60.

This is done with the closing-off cover 132 not yet mounted, so it is only once the housing 102 of the installation unit 100 has been pushed into the receptacle 72 that the closing-off cover 132 is placed on, after the infeed line that is introduced by the cable feed 138 has been connected to the line connector element 114.

Figure 9:
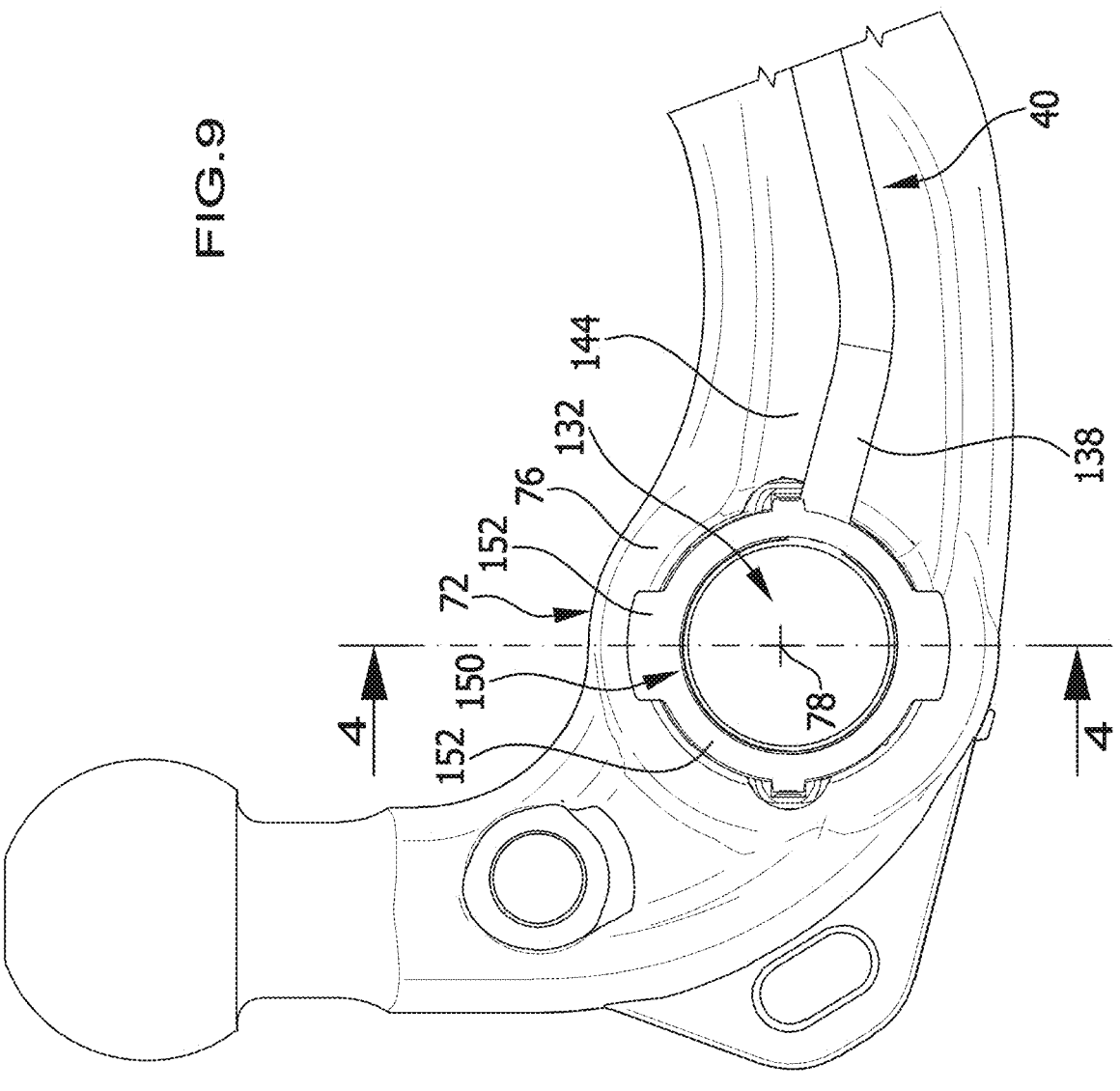
FIG. 9 shows a side view of the carrier element, with a view of the fixing element, in the first exemplary embodiment of the installation unit according to the invention.
Figure 10:
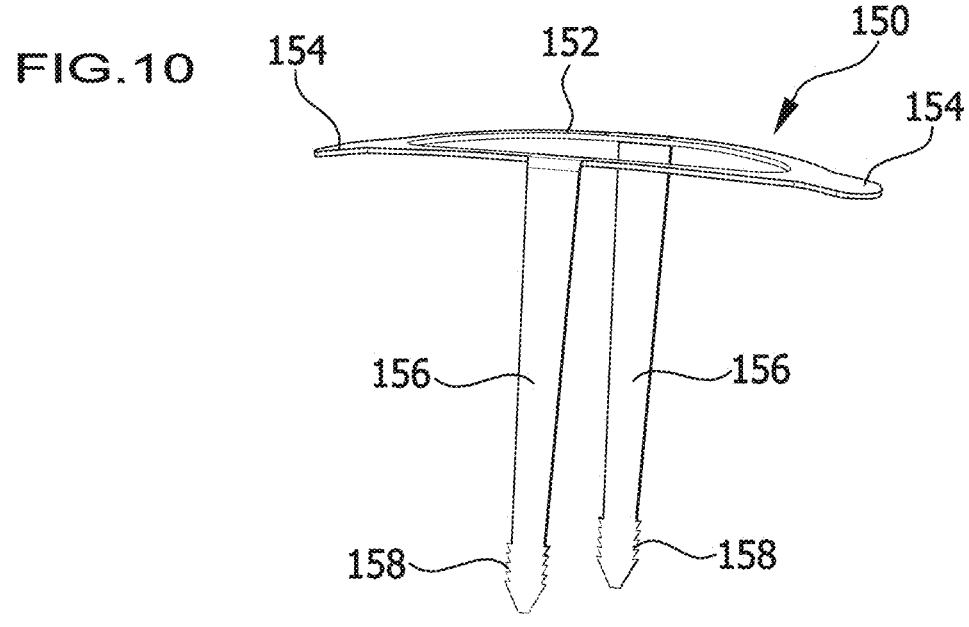
FIG. 10 shows a perspective illustration of the fixing element of the first exemplary embodiment of the installation unit according to the invention, with an illustration of a convexity of the seating element.

In this case, and as illustrated in FIG. 9, the cable feed 138 preferably lies in a recess 144 in the carrier element 40 that is set back in relation to the second outer side 76 of the receptacle 72, with the result that the cable feed 138 is substantially protected by the carrier element 40 from external mechanical influences.

The housing 102 is fixed by a fixing unit that is illustrated in FIGS. 7 to 10 and takes the form of a fixing element 150, which in the first exemplary embodiment has a seating body 152 that, for its part, comprises for example seating projections 154, such that it is configured to abut against the second outer side 76 in order to be supported against this.

Figure 11:
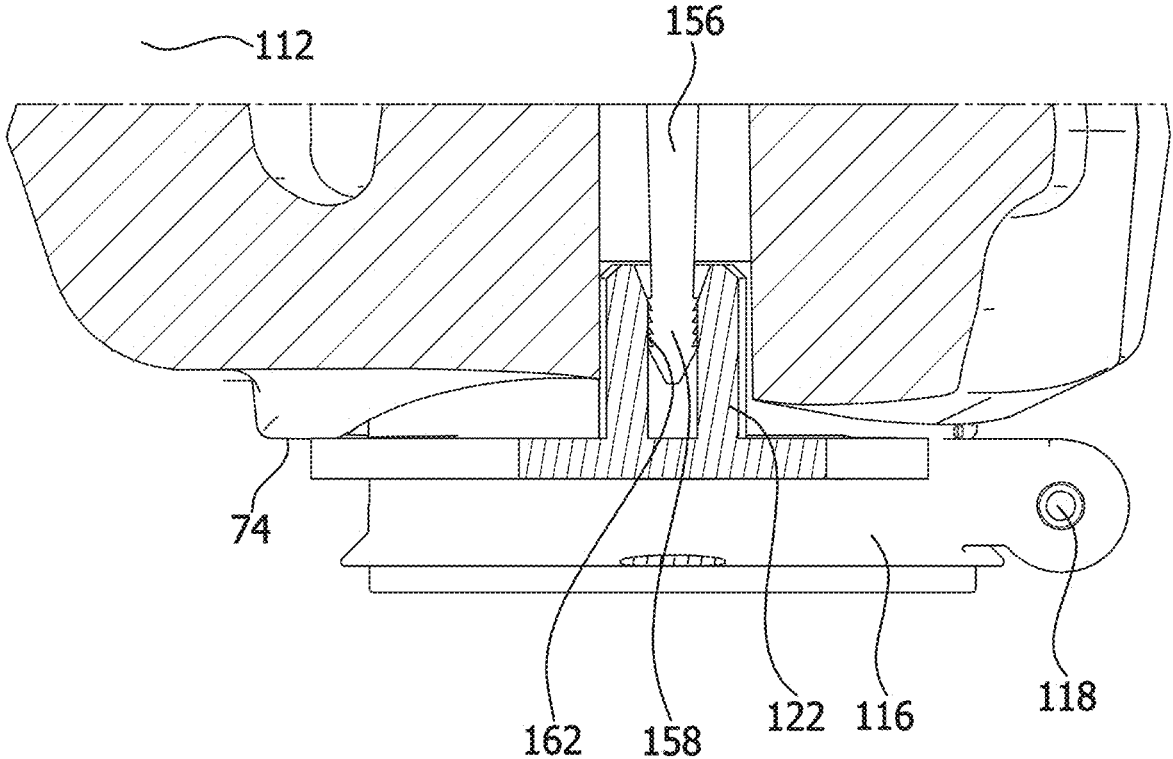
FIG. 11 shows a section along the line 11-11 in FIG. 5.
Figure 12:
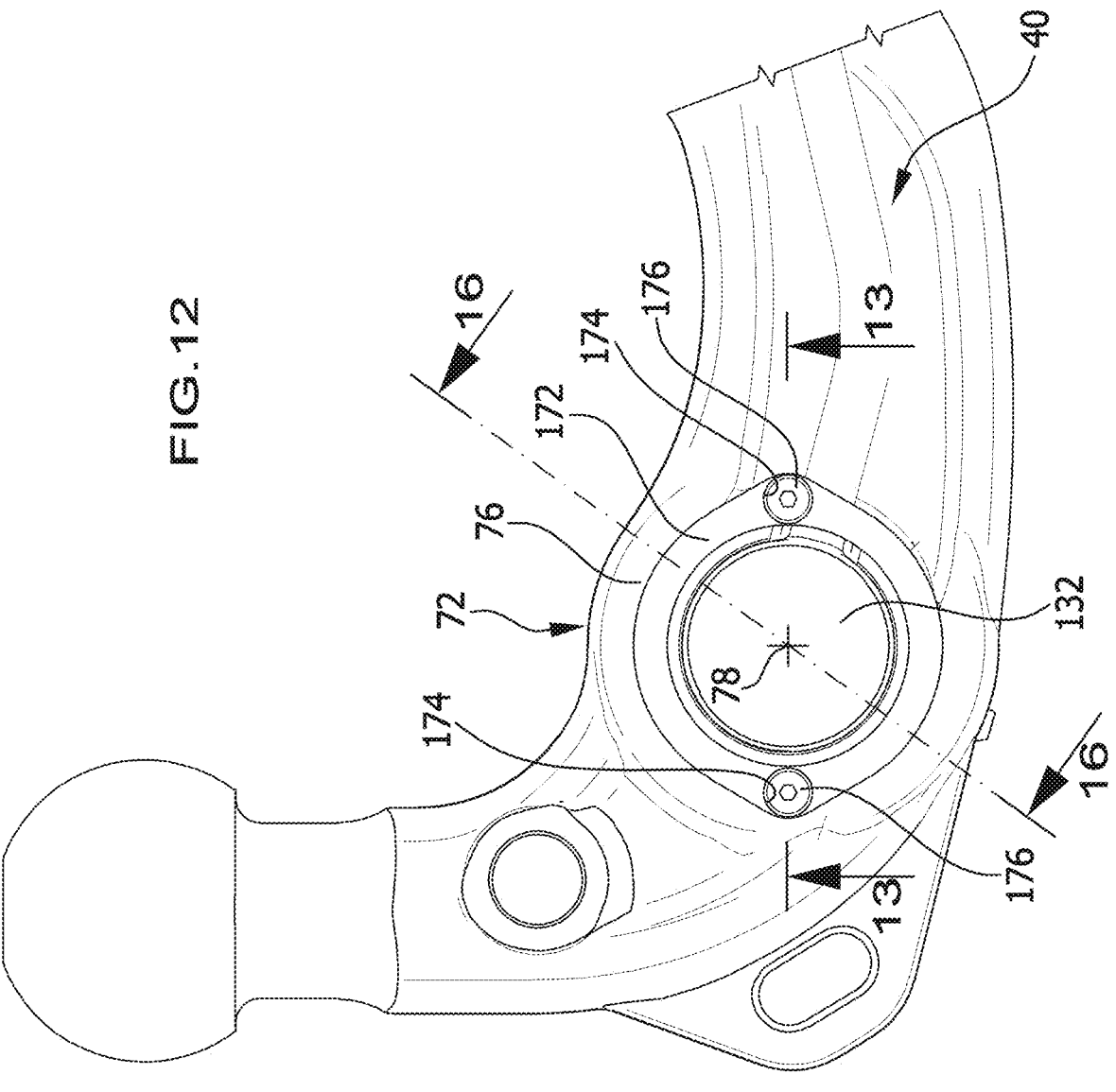
FIG. 12 shows a side view of a carrier element, with a second exemplary embodiment of an installation unit according to the invention, similar to FIG. 9.

Further, the seating body 152 is provided with holding anchors 156 that are arranged between the seating projections 154 and are provided, at their ends remote from the seating body 152, with latching elements 158 that, for their part, as illustrated in FIG. 11, are configured to latch into latching receptacles 162 of the projections 122, such that in the mounted condition, as a result of being supported against the second outer side 76, the fixing element 150 acts on the housing 102 in the region of the projections 122 and hence secures the housing 102 against movement counter to the direction 142 of pushing in within the receptacle 72.

Preferably, the fixing element 150 is provided with an at least slightly resiliently formed seating body 152 that is slightly convex for example in the direction of the access side 130 and hence also in the direction of the second outer side 76, with the result that the seating projections 154 are arranged projecting in the direction of the second outer face 76 in relation to the seating body 152, in the region of the holding anchors 156 acting thereon, and thus pressure on the fixing element 150 in the direction of the second outer side 76 and pushing the holding anchors 156, with the latching elements 158, into the latching receptacles 162 result in a deformation of the seating body 152 which reduces the convexity, wherein the seating body 152 thus itself abuts against the second outer side 76 and consequently keeps the first housing portion 104 of the housing 102 in abutment against the first outer side 74 under the action of force.

Because the latching element 158 is latchable in different positions in the latching receptacle 162, for example—as illustrated in FIG. 11—by a latching receptacle 162 that has a greater longitudinal extent than the respective latching element 158, it is possible when latching the fixing element 150 to the housing 102 to compensate for tolerances in respect of the spacing between the outer side 74 and the outer side 76.

This makes it possible for the coupling element 40 and thus also the receiving region 60 to be formed as a forged part, which results in dimensional tolerances occurring between the outer sides 74 and 76, which may however be compensated in the manner described above when the installation unit 100 is mounted.

In a second exemplary embodiment, illustrated in FIGS. 12 to 17, elements that are identical to those of the first exemplary embodiment are provided with the same reference numerals, so for a description thereof reference may be made to the statements relating to the first exemplary embodiment in their entirety.

Figure 13:
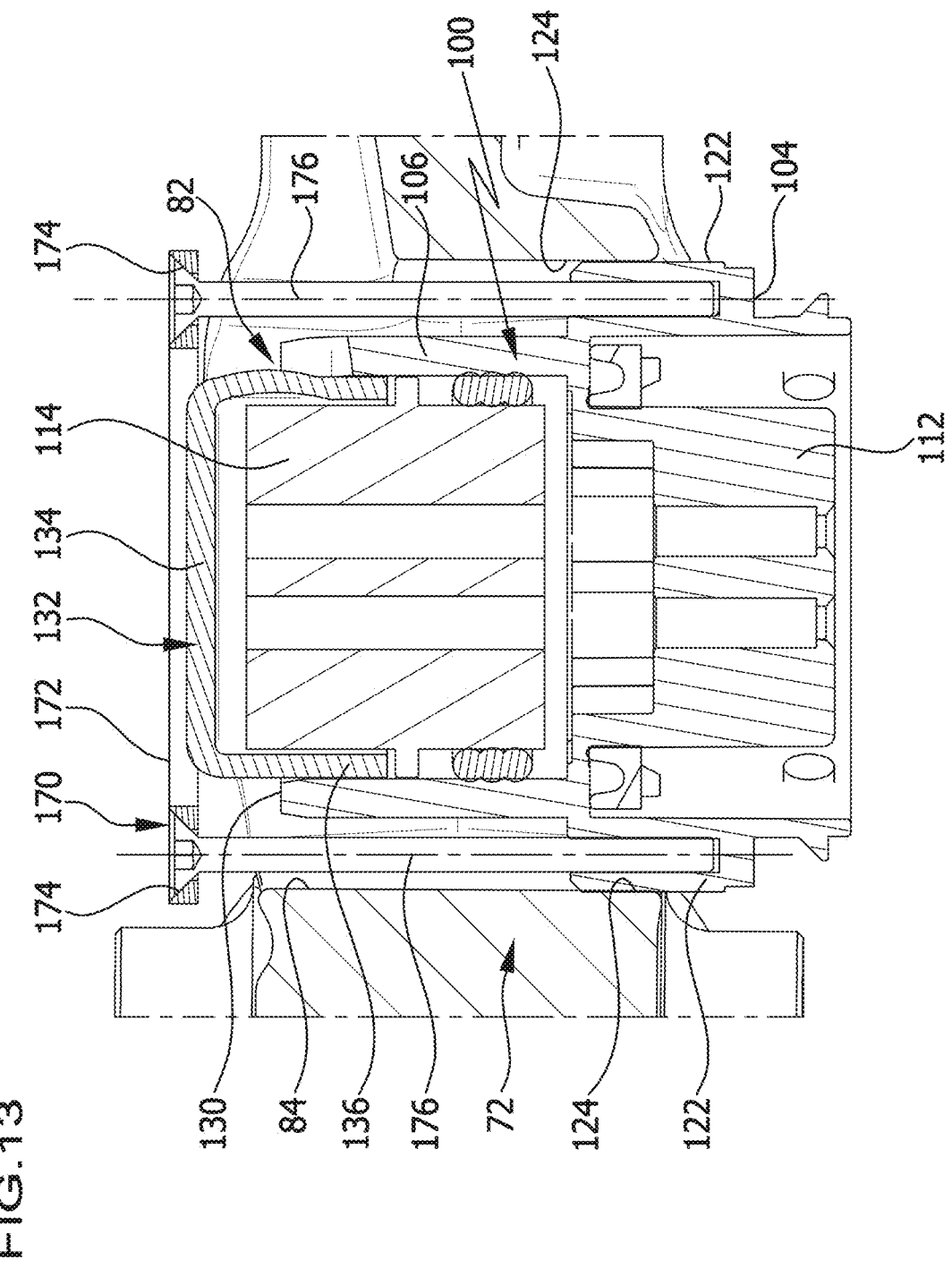
FIG. 13 shows a section along the line 13-13 in FIG. 12.
Figure 14:
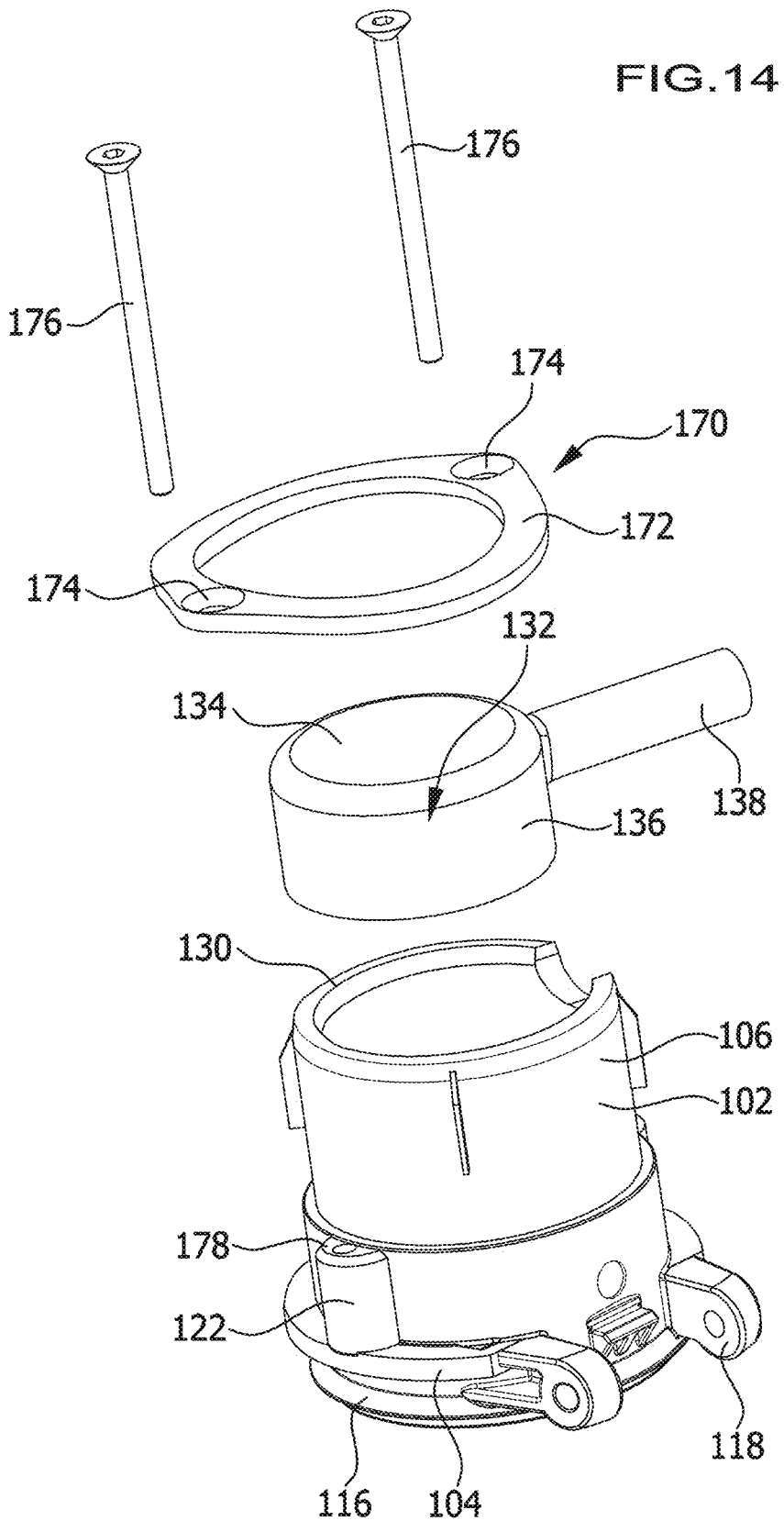
FIG. 14 shows a perspective exploded illustration of the second exemplary embodiment of the installation unit according to the invention.
Figure 15:
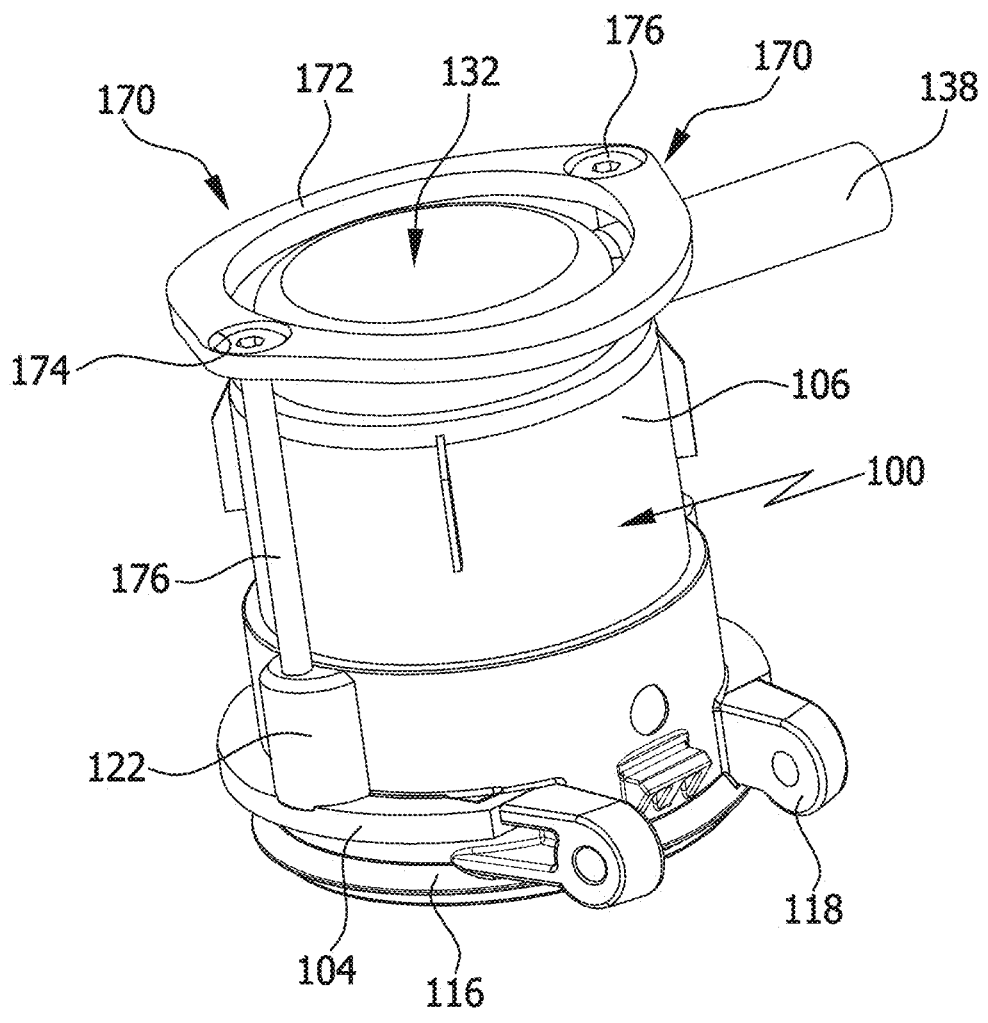
FIG. 15 shows a perspective illustration of the second exemplary embodiment of the installation unit according to the invention, in the assembled condition.

In contrast to the first exemplary embodiment, and as illustrated in FIG. 14, the fixing unit, which takes the form of fixing element 170, comprises a seating body 172 that takes the form of an annular body and has apertures 174 through which screwing anchors 176 are configured to be pushed, wherein the screwing anchors 176 are configured to be screwed into screw openings 178 in the projections 122 in order, as illustrated in FIG. 13, by means of the screwing anchors 176 to cause the seating body 172 to abut against the second outer side 76 of the receiving region 60 and thus to clamp against one another the seating body 172 and the first housing portion 104, which abuts against the outer side 74.

Figures 16, 17:
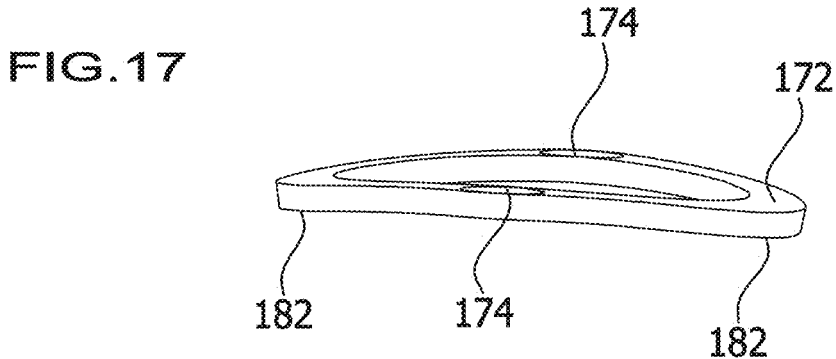
FIG. 16 shows a section along the line 16-16 in FIG. 12.
FIG. 17 shows a perspective illustration of a seating body of the second exemplary embodiment of the installation unit according to the invention.
Figure 18:
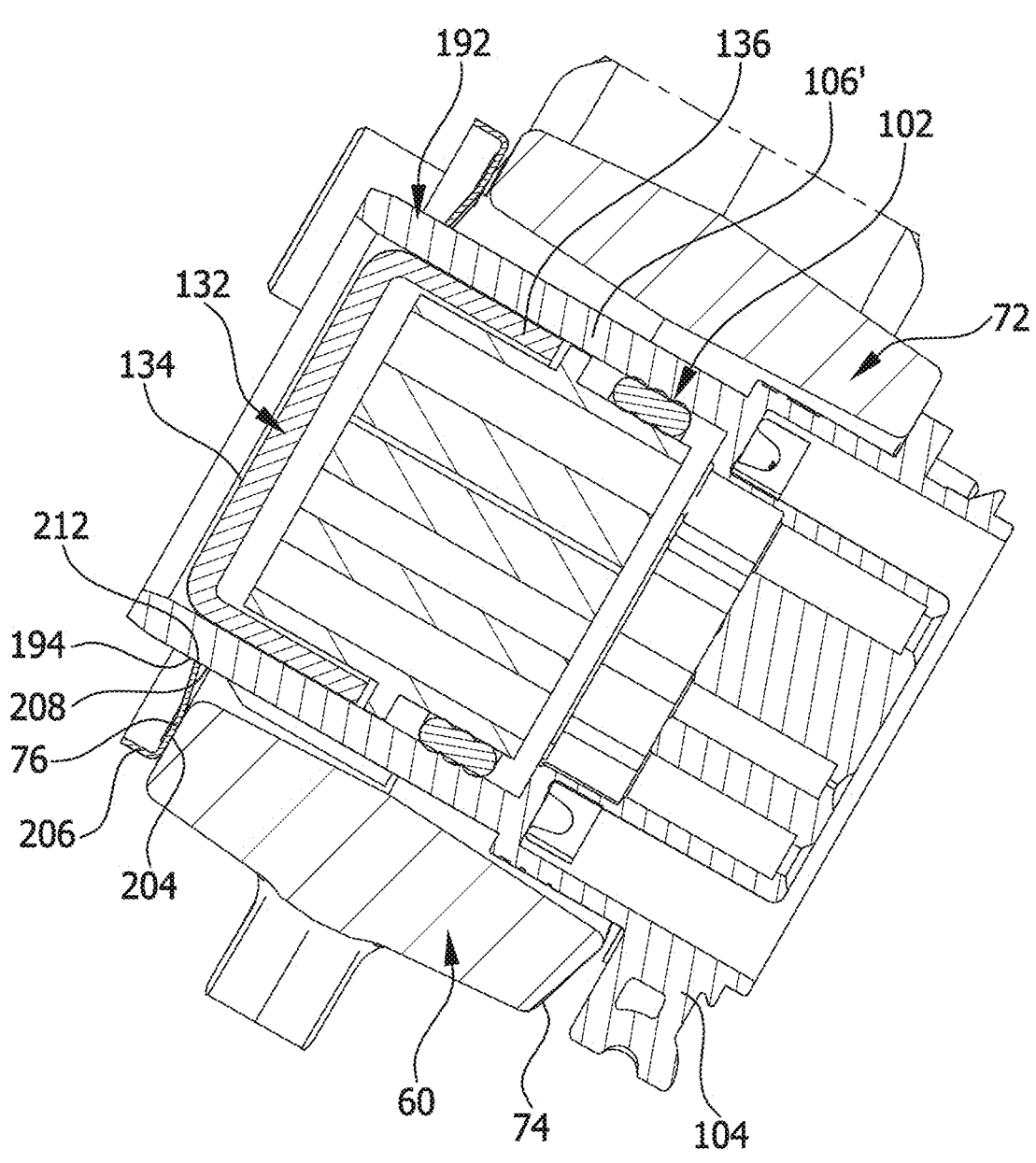
FIG. 18 shows a section along the line 18-18 in FIG. 21, through a third exemplary embodiment of an installation unit according to the invention.
Figure 19:
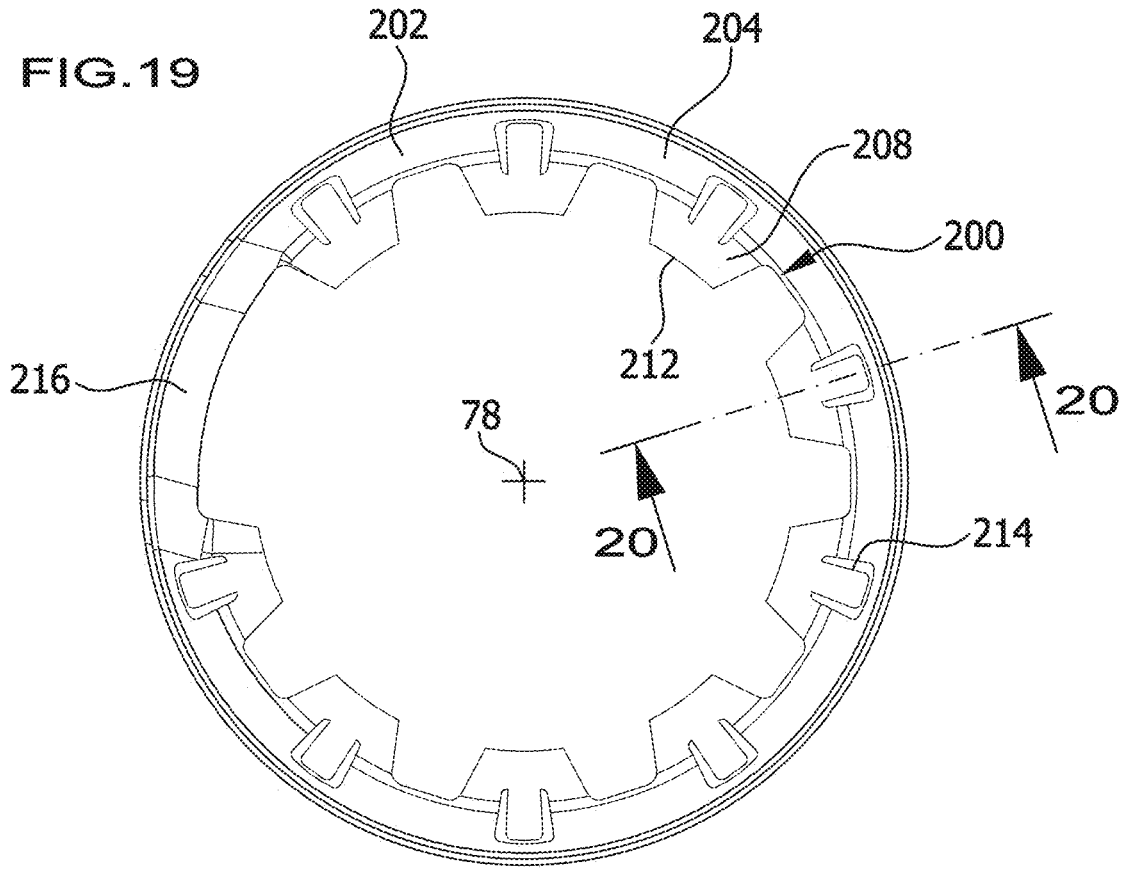
FIG. 19 shows a plan view of a fixing element of the third exemplary embodiment of the installation unit according to the invention.
Figure 20:
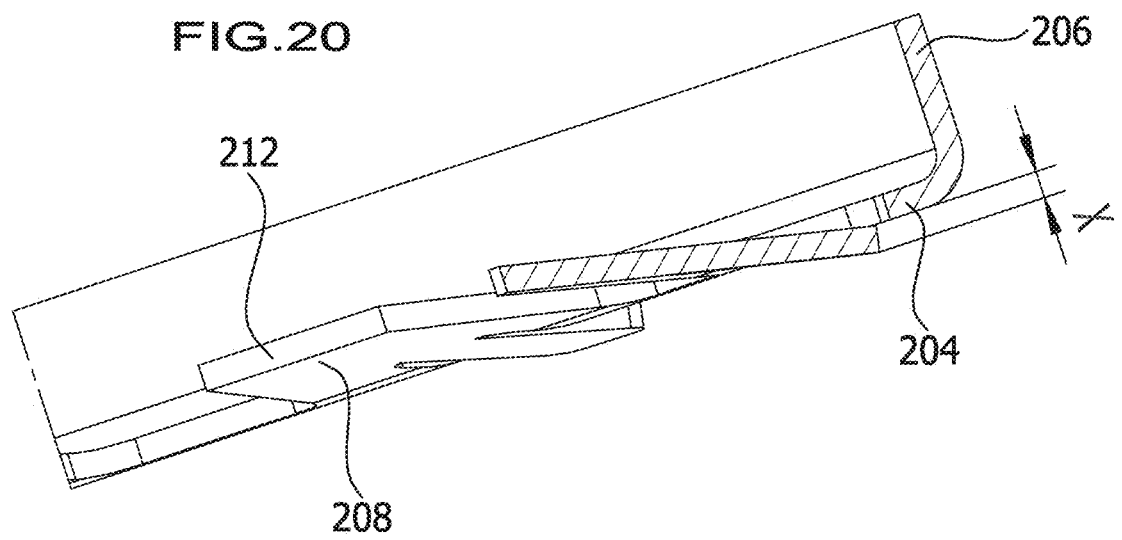
FIG. 20 shows a section along the line 20-20 in FIG. 19.

Moreover, as illustrated in FIG. 17, the seating body 172 is likewise deformed such that subregions 182 of the seating body 172 that lie between the apertures 174 extend further in the direction of the outer side 76, with the result that screwing the screwing anchors 176 into the screw receptacles 178 produces a deformation in the seating body 172 that results in a permanent resilient action of force between the seating body 172 and the first housing portion 104, in order to fix the housing 102 securely in the receptacle 72 without play.

As a result of the screwing anchors 176 that are configured to be screwed into the screw receptacles 178, a compensation of tolerance is likewise possible.

In a third exemplary embodiment of an installation unit according to the invention 100, illustrated in FIGS. 18 to 22, once again elements that are identical to those of the exemplary embodiments above are provided with the same reference numerals, so reference may be made to the statements relating to these exemplary embodiments in their entirety.

In the third exemplary embodiment, however, by means of a fixing portion 192 the second housing portion 106' extends in the direction of the center axis 78 beyond the second outer side 76, wherein the fixing portion 192 has a peripheral holding face 194 for a fixing unit, which comprises a fixing element that is designated 200 as a whole.

The fixing element 200 takes the form of an annular body 202, wherein the annular body 202 has a flat region 204 that runs transversely, preferably perpendicular to the center axis 78, and from which an external upright edge 206 projects, running transversely to the flat region 204, for the purpose of stabilization.

The flat region 204 preferably lies in a plane that runs transversely, in particular perpendicular, to the center axis 78, and in this plane there also lie fixing tabs 208 that project radially inward from the flat region 204 and extend in the direction of the holding face 194 of the fixing portion 192 in order, when the annular body 202 is pushed on, to grip into the holding face 194 in the manner of claws, wherein when the annular body 202 of the fixing unit 200 is pushed onto the fixing portion 194 there is a slight deformation in the region of the fixing tabs 208, which abut against the holding face 194 by means of their tab ends 212 and preferably engage in the material of the fixing portion 192, gripping in the manner of claws.

If the fixing portion 192 is made from plastics—as indeed the entire housing 102 conventionally is—and the fixing element 200, in particular the annular body 202, takes the form of a metal part, there is for example a so-called digging of the fixing tabs 208 into the material of the fixing portion 192 and hence a fixing of the fixing tabs 208 on the holding face 194, with the result that the first housing portion 104, which is fixedly connected to the second housing portion, is likewise held in abutment against the first outer side 74 and, as a result of the fixing unit 200 being brought into abutment against the second outer side 76, fixing of the entire installation unit 100 in the receptacle 92 is possible in a manner that is firm and at the same time not sensitive to tolerance.

Preferably, the fixing tabs 208 are formed such that there is also provided in a formation of the fixing tabs 208, in the flat region 204, a cutout 214 that contribute to enhanced flexibility of the fixing tabs 208 in the direction of the center axis 78 and thus to more resilience of the fixing tabs 208 in relation to the annular body 202.

Figure 21:
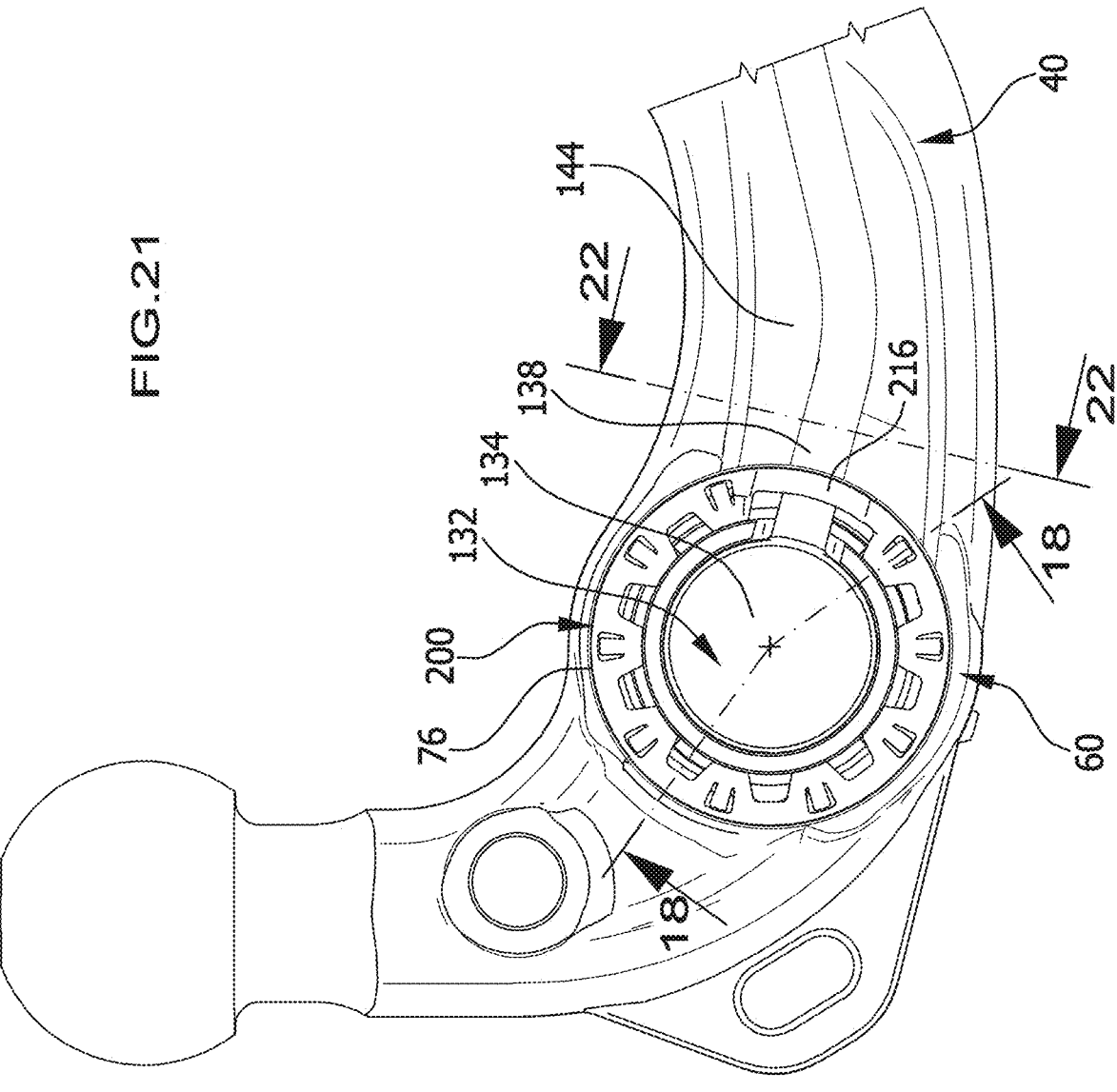
FIG. 21 shows a side view, similar to FIG. 9, of the fixing element of the third exemplary embodiment of the installation unit according to the invention, mounted in the carrier element.
Figure 22:
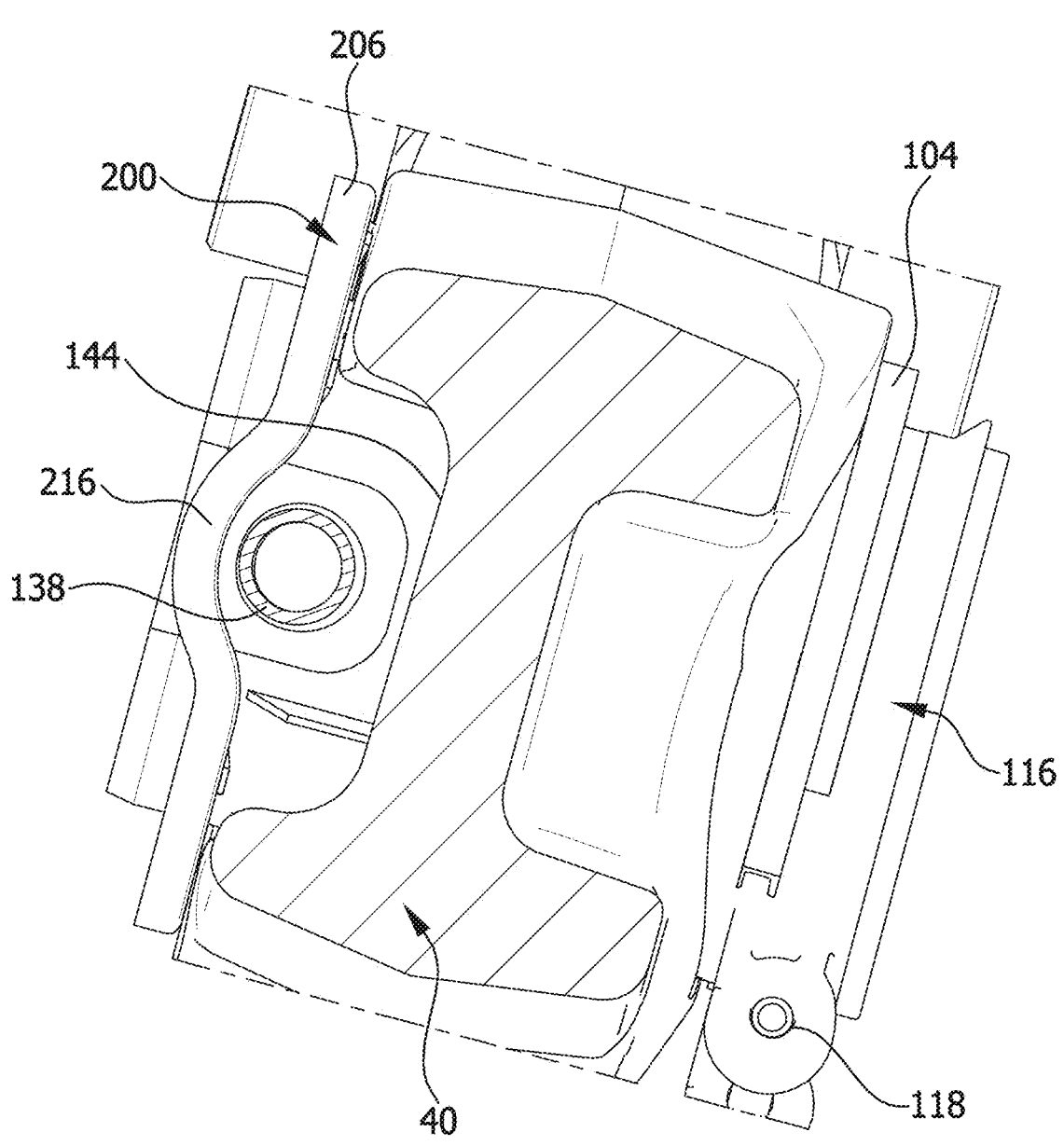
FIG. 22 shows a section along the line 22-22 in FIG. 21.
Figure 23:
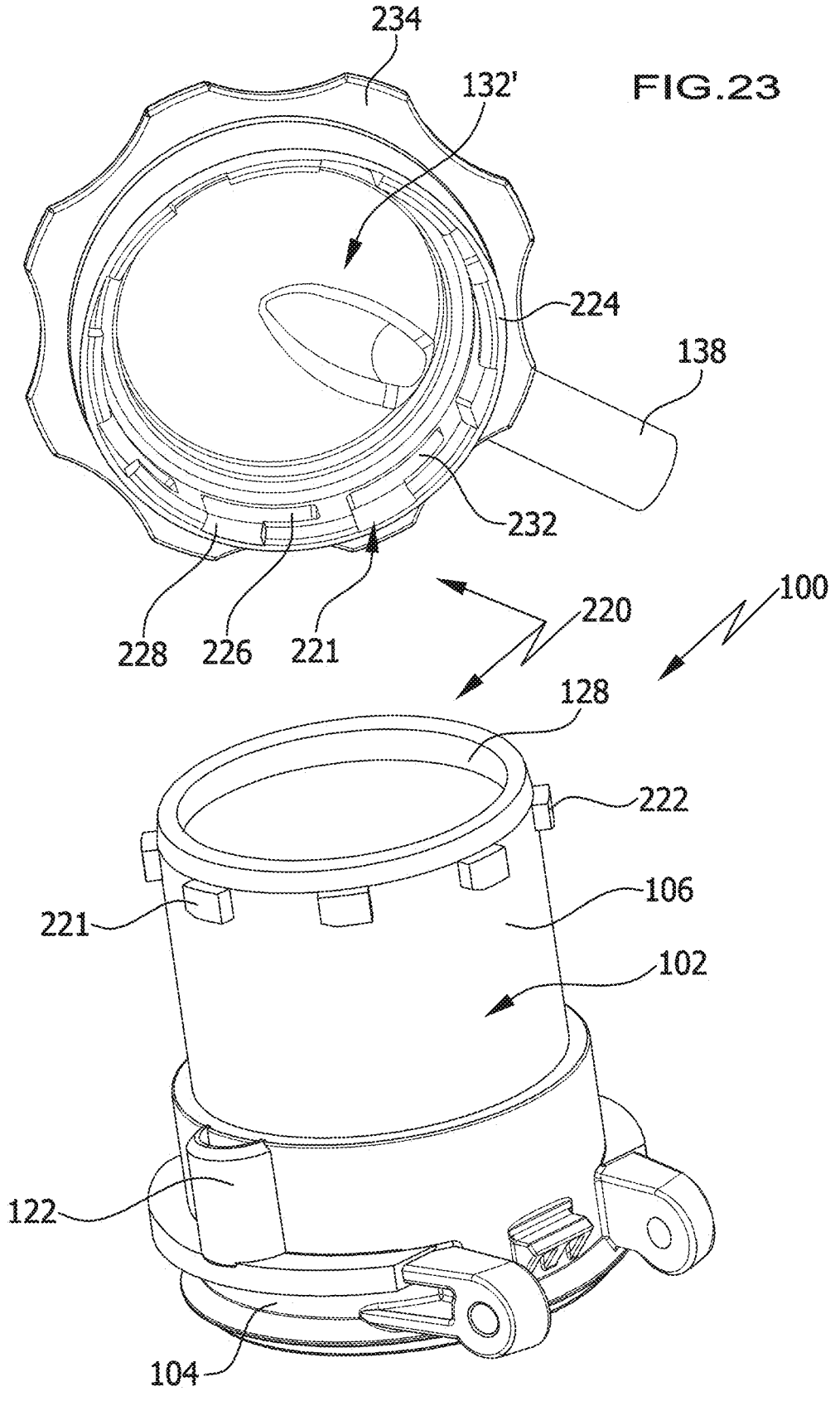
FIG. 23 shows a perspective exploded illustration of a fourth exemplary embodiment of an installation unit according to the invention.
Figure 24:
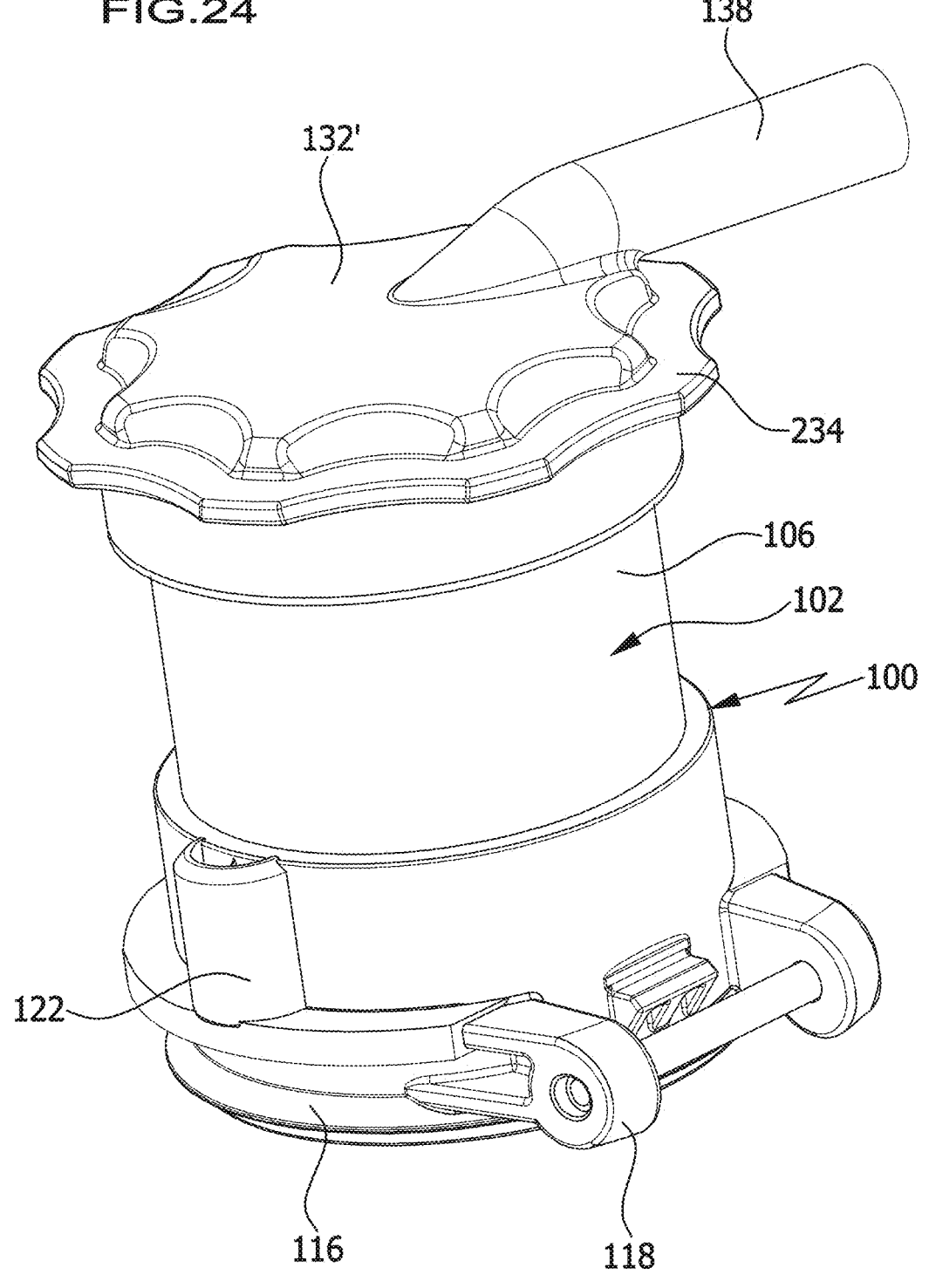
FIG. 24 shows a perspective illustration of the fourth exemplary embodiment of the installation unit according to the invention, in the assembled condition.
Figure 25:
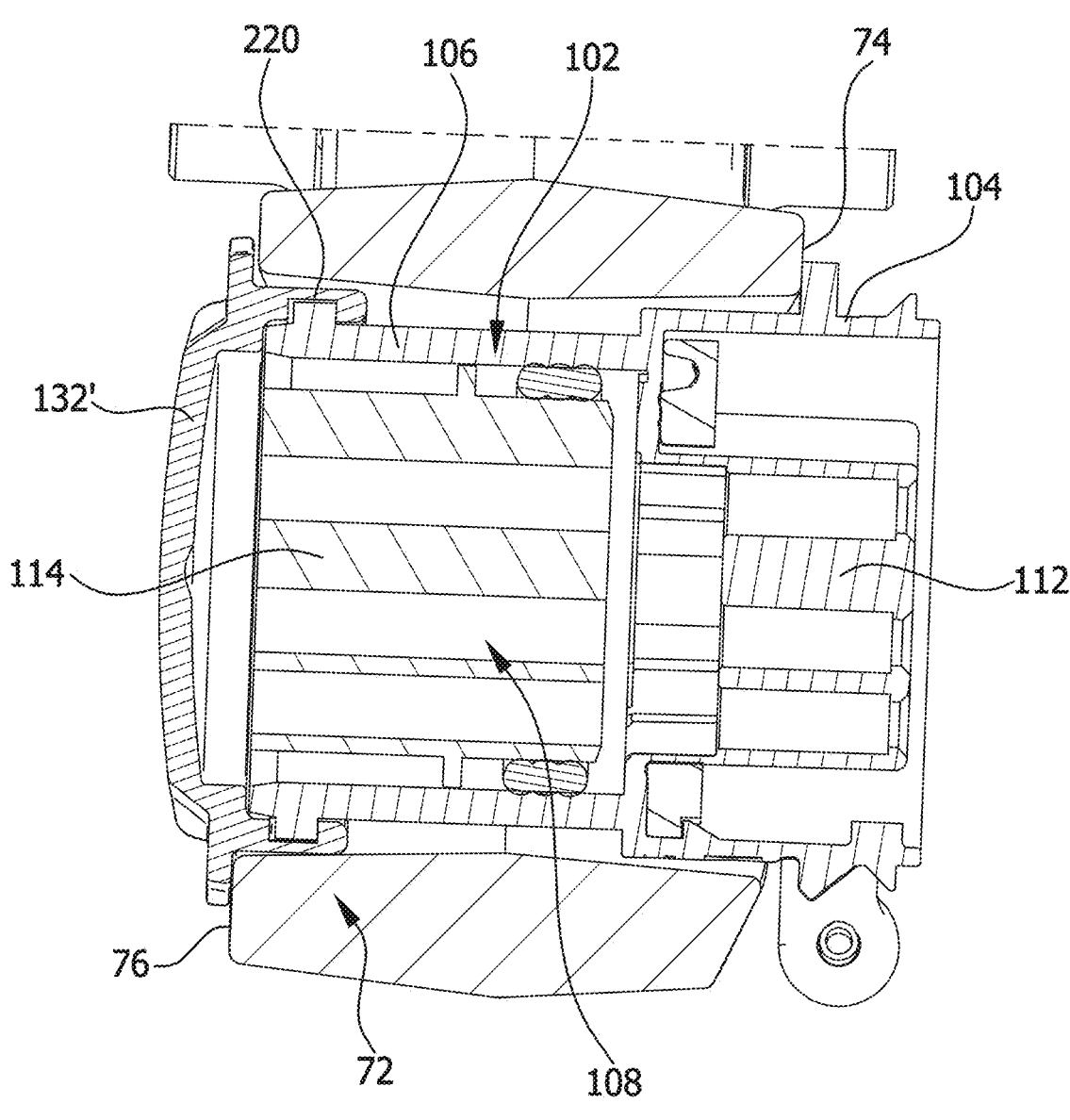
FIG. 25 shows a section along the line 25-25 in FIG. 27.
Figure 26:
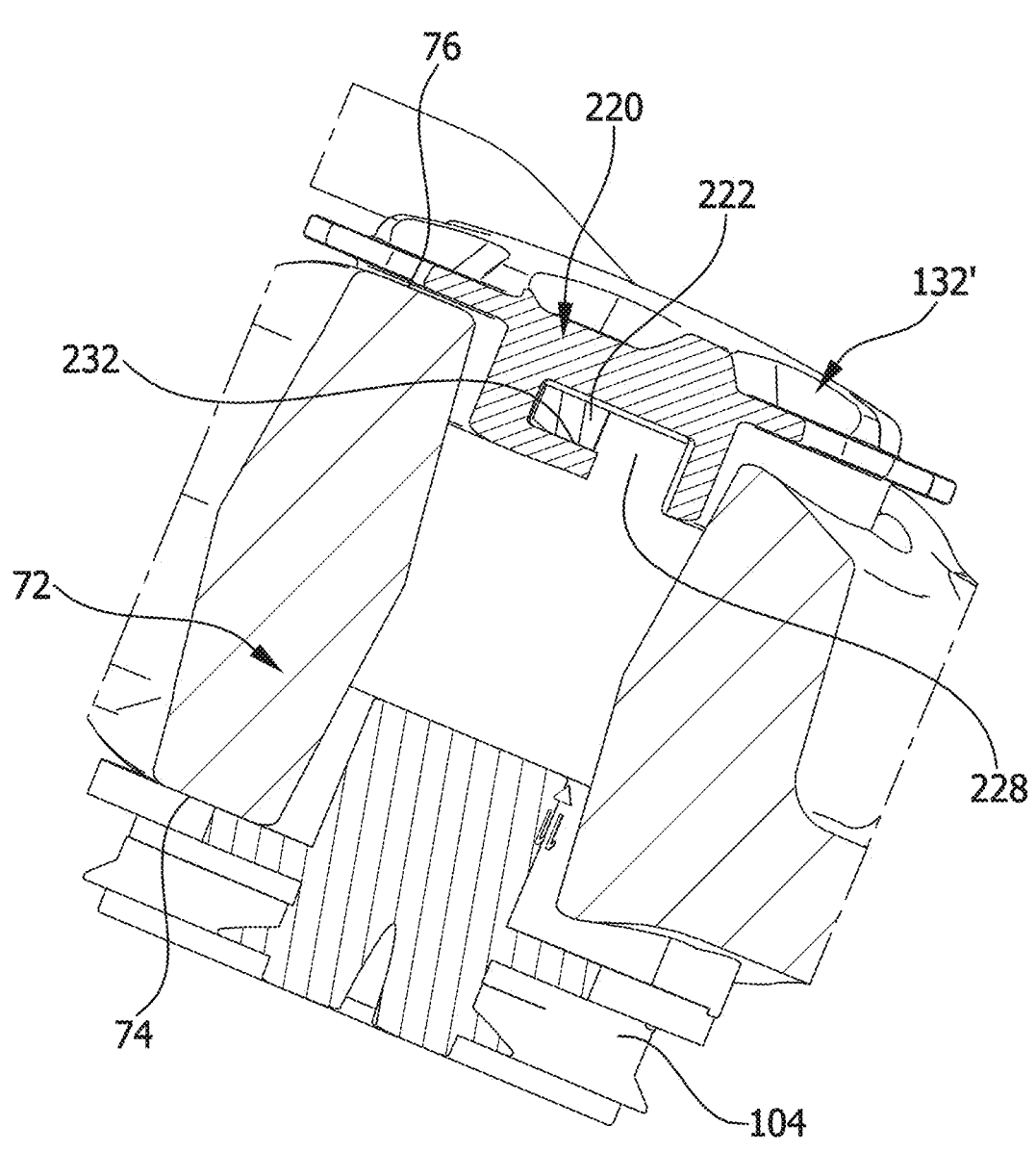
FIG. 26 shows a section along the line 26-26 in FIG. 27.
Figure 27:
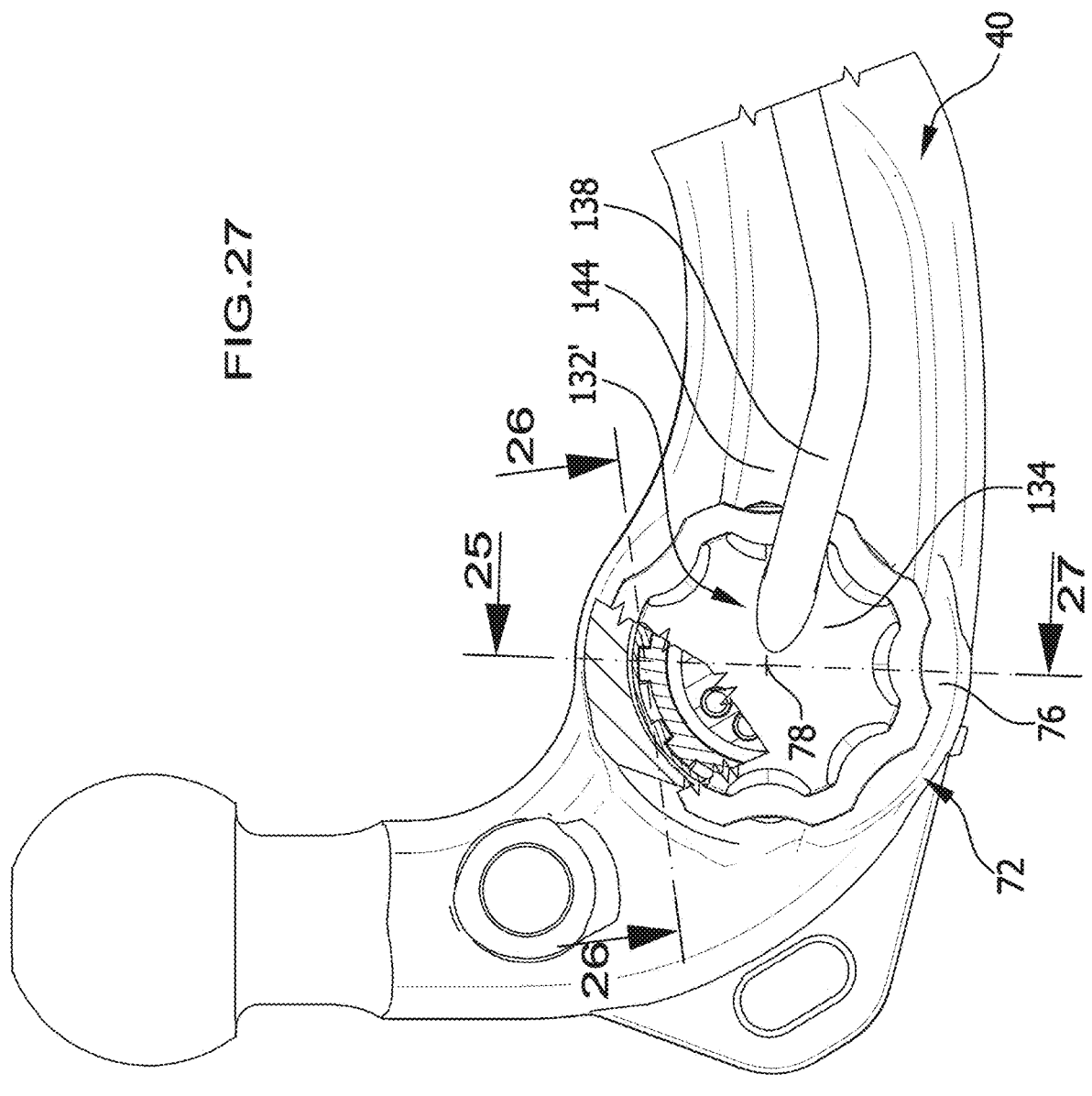
FIG. 27 shows a side plan view of the fourth exemplary embodiment of the installation unit according to the invention, similar to FIG. 9.

Moreover, in the third exemplary embodiment there is also integrally formed on the fixing unit 200, in particular the annular body 202, a holding bracket 216 which, in the region of the cable feed 138 of the closing-off cover 132, also keeps the cable feed 138 urged in the direction of the recess 144 in the carrier element 40, in order thus to fix the cable feed 138 in the recess 144 at the same time (FIGS. 21 and 22).

In a fourth exemplary embodiment, illustrated in FIGS. 23 to 27, elements that are identical to those of the exemplary embodiments above are provided with the same reference numerals, so for a description thereof reference is made to the statements relating to the exemplary embodiments above in their entirety.

In contrast to the exemplary embodiments above, as illustrated in FIGS. 23 to 27 the closing-off cover 132' is fixable on the second housing portion 106 by means of a fixing unit 220 that comprises a bayonet closure 221, wherein for this purpose closure bodies 222 of the bayonet closure 221 are arranged around the access opening 128 to the housing portion 106, while there are arranged in a cylindrical attachment 224 of the closing-off cover 132', which is formed such that it embraces the second housing portion 106 on its outer side, closure receptacles 226 of the bayonet closure 221, which have introduction regions 228 through which the closure bodies 222 are movable into the closure receptacles 226 when the closing-off cover 132' is placed on the second housing portion 106, wherein by rotating the closing-off cover 132' the closure bodies 222 of the bayonet closure are then movable into the bayonet receptacles 232 of the closure receptacles 226, in which the closure bodies 222 reliably secure the closing-off cover 132' to prevent its being lifted off the second housing portion 106.

Further, the fixing unit 220 comprises a fixing flange 234, which is integrally formed on the closing-off cover 132' of the fourth exemplary embodiment, and which is fixedly connected to the closing-off cover 132' and, when the closing-off cover 132' is fixed on the second housing portion 106, abuts against the second outer side 76 of the receiving region 60 and thus fixes the installation unit 100 in the receptacle 72, with abutment of the first housing portion 104 against the outer face 74.

Figure 28:
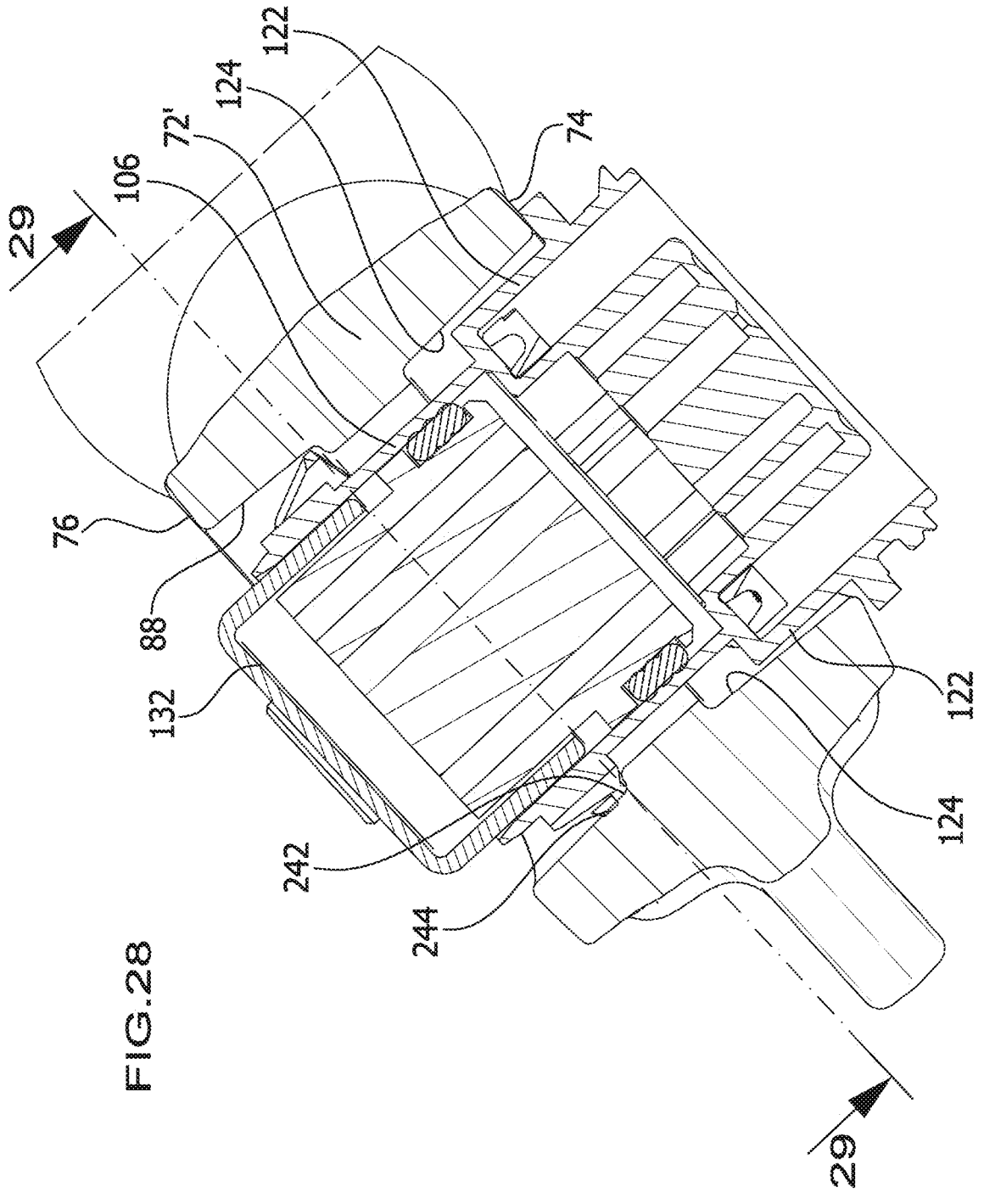
FIG. 28 shows a section along the line 28-28 in FIG. 29, through a fifth exemplary embodiment of an installation unit according to the invention.
Figure 29:
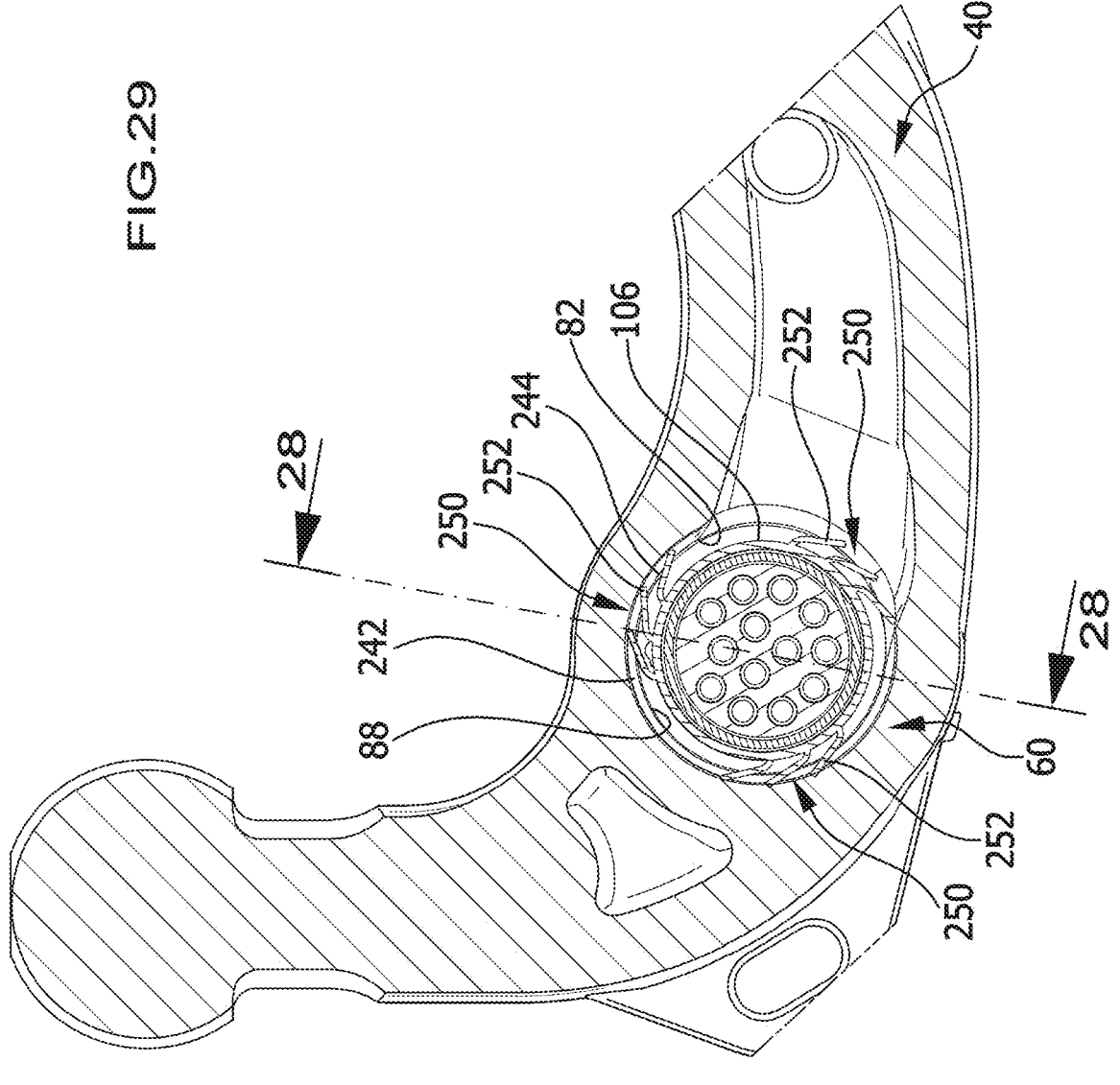
FIG. 29 shows a section along the line 29-29 in FIG. 28, through the carrier element with an installed fifth exemplary embodiment of the installation unit according to the invention.
Figure 30:
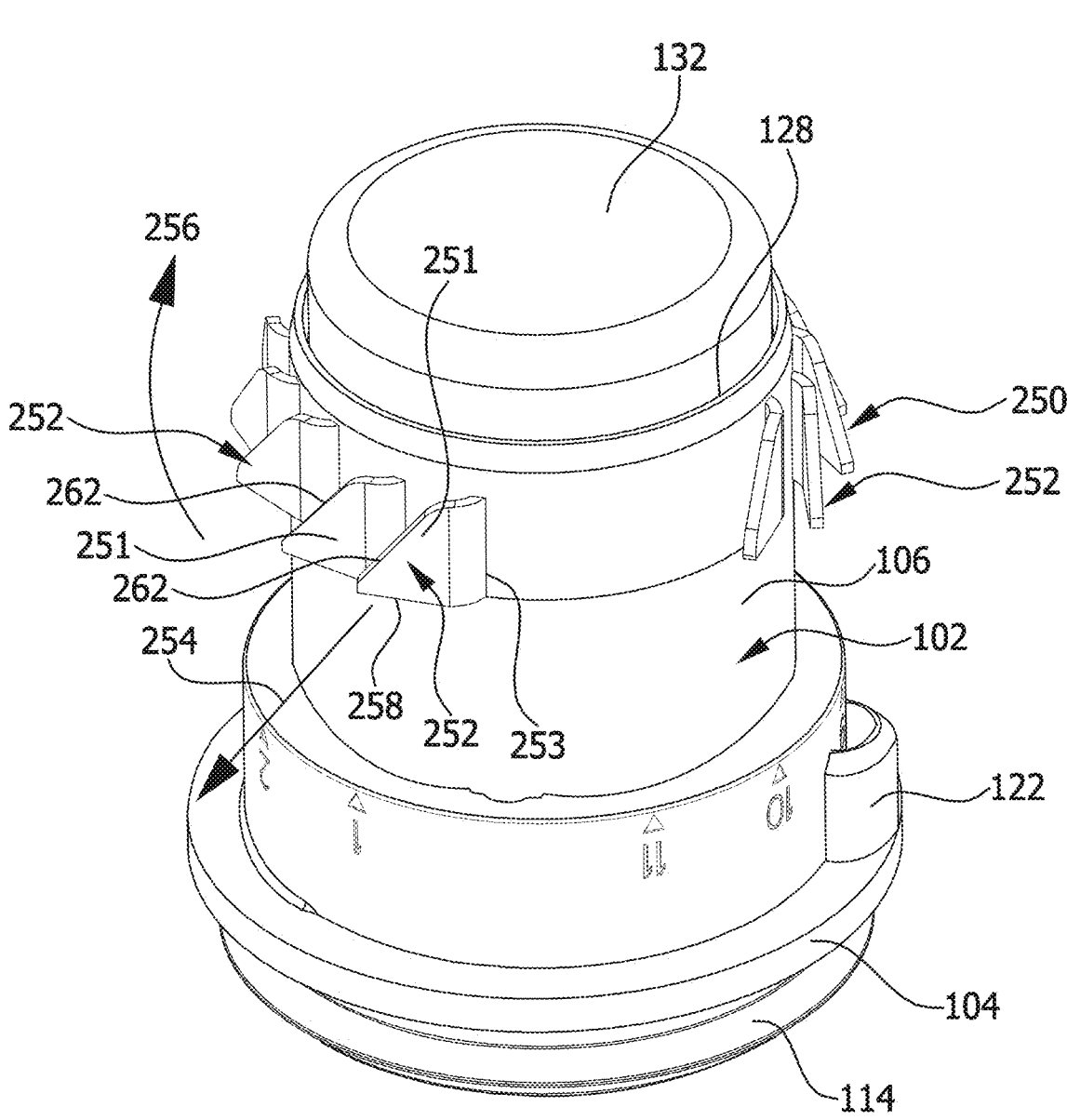
FIG. 30 shows a perspective illustration of the fifth exemplary embodiment of the installation unit according to the invention.

In a fifth exemplary embodiment, illustrated in FIGS. 28 to 30, the wall region 88 of the receptacle 72' is provided with a step 242 that has a step face 244 facing the second outer side 76.

For the purpose of fixing the second housing portion 106 in the receptacle 72', the second housing portion 106, as illustrated in FIGS. 29 and 30, is provided with a fixing unit 250 that comprises at least two, preferably more, fixing projections 252, wherein each fixing projection 252 extends on the one hand in the radial direction 254 in relation to the second housing portion 106 and on the other in a peripheral direction 256 around the second housing portion.

Each of these fixing projections 252 takes the form in particular of a type of blade 251 that extends parallel to the center axis 78 or direction of pushing in 142, and at the same time is resiliently movable in relation to the second housing portion 106, wherein each of the fixing projections 252 extends independently, without the action of any external force, away from the second housing portion 106 in radial direction 254. For this purpose, the blade 251 is connected to the second housing portion 106 by a longitudinal side 253 that extends approximately parallel to the center axis 78 or direction of pushing in 142.

In this way, the respective fixing projection 252 is in a position to be supported on the step face 244, without the action of any external force, by a support edge 258 that extends transversely to the longitudinal side 253, and hence to secure the housing 102 against movement out of the receiving channel 83 in a direction counter to the direction of pushing in 142.

Moreover, each of these projections 252 also comprises an inwardly pivotal edge 262, which runs obliquely in relation to the direction of pushing in 142 and transversely in relation to the longitudinal side 253, and which, when the housing 102 is moved in the direction of pushing in 142, comes into contact with the inner wall 84 of the receiving channel 82 and hence deforms the respective fixing projection 252 such that it moves from its original, radial extent in relation to the second housing portion 106 in the radial direction 254, far enough toward the second housing portion 106 for the housing 102 to be pushable into the receiving channel 82, while the fixing projections 252 slide along the inner wall 84 until the support edge 258 reaches the step face 244, and the respective fixing projection 252 can thus expand radially outward again and return to its original shape, in which each of the fixing projections 252 then preferably contributes, by means of the support edge 258, to securing the housing 102 in the receptacle 72'.

As can be seen in particular in FIGS. 29 and 30, provided for example on the second housing portion 106 are three sets of such fixing projections 252, wherein each set comprises for example three fixing projections 252, and thus an arrangement of the three sets of fixing projections 252 at equal angular spacings results in a symmetrical support of the second housing portion 106 against the step face 244 of the receptacle 72'.

In the fifth exemplary embodiment, the closing-off cover 132 here is inserted in the same way as in the exemplary embodiments above for the purpose of closing the access opening 128 to the second housing portion 106.

Moreover, also in the fifth exemplary embodiment, for the purpose of fixing the second housing portion 106 in the receptacle 72' such that it cannot rotate, two projections 122 are integrally formed on the second housing portion 106 and engage in recesses 124 in the receptacle 72', in the same way as that described in conjunction with the exemplary embodiments above.

Otherwise, elements that are identical to those of the exemplary embodiments above take the same form in both the fifth exemplary embodiment and the sixth exemplary embodiment below as in the exemplary embodiments above, so reference is made to the statements relating to the exemplary embodiments above in their entirety.

Figure 31:
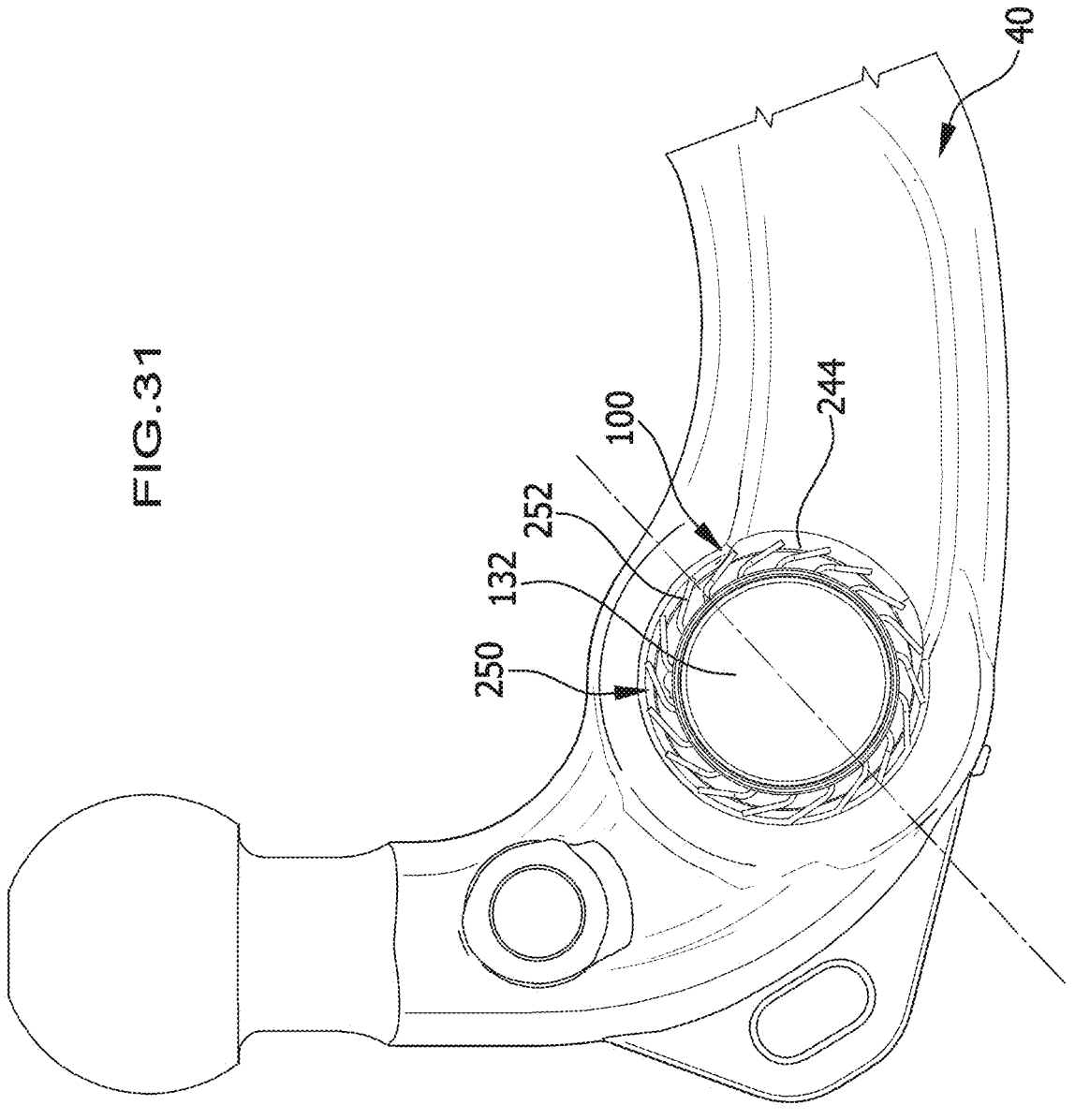
FIG. 31 shows a side view, similar to FIG. 9, of a sixth exemplary embodiment of an installation unit according to the invention.
Figure 32:
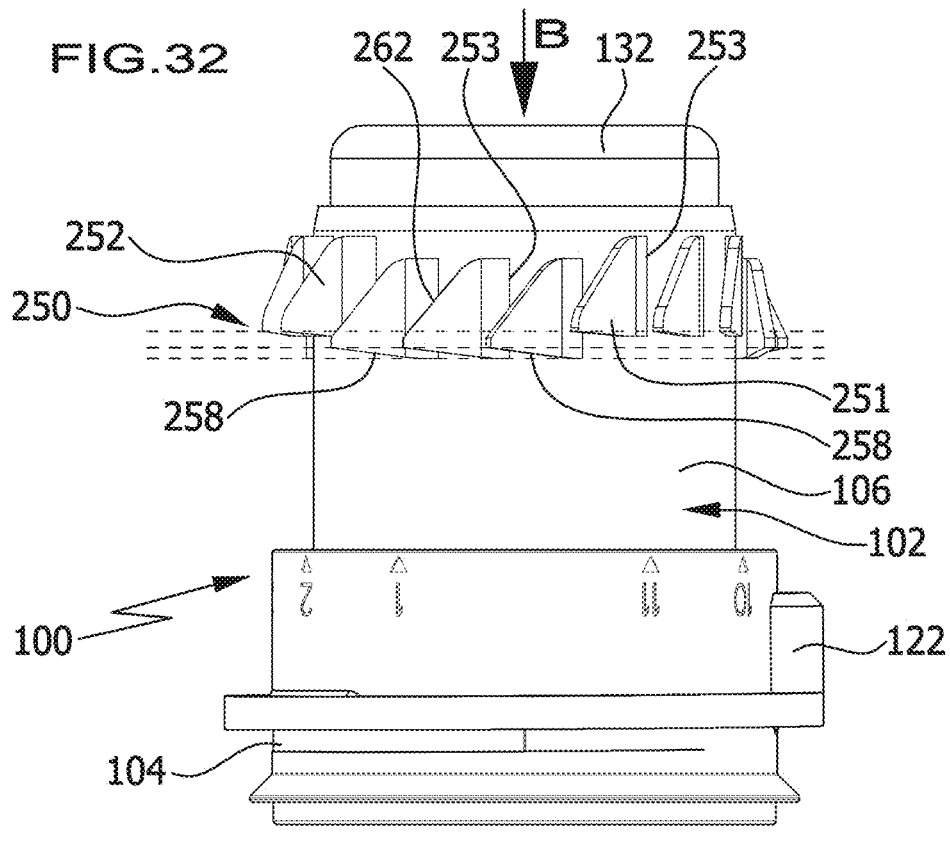
FIG. 32 shows a side view of the sixth exemplary embodiment of the installation unit according to the invention.
Figure 33:
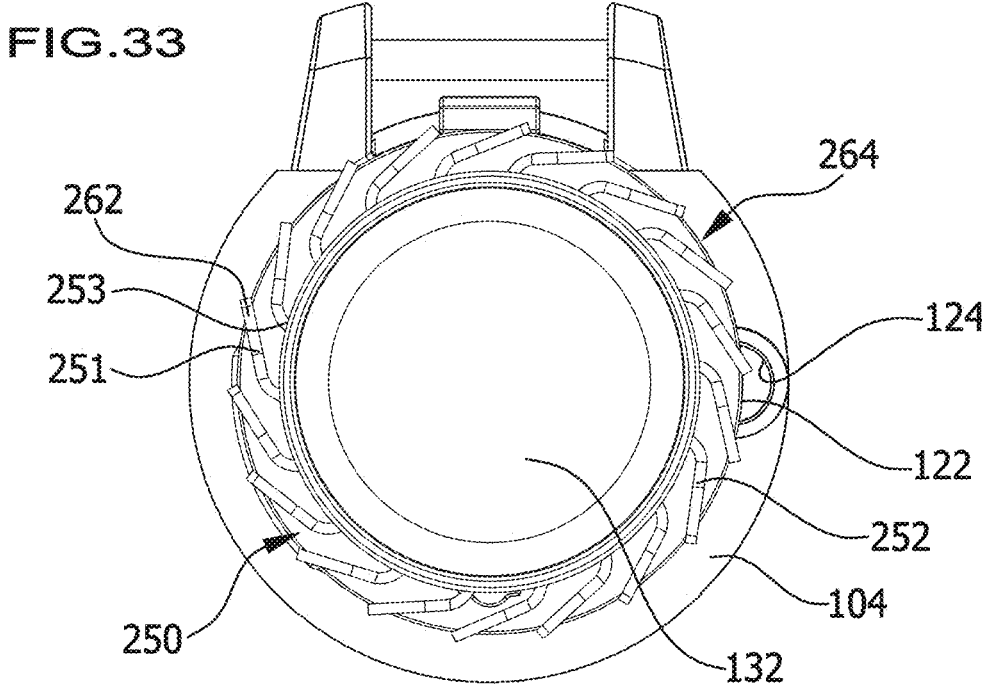
FIG. 33 shows a plan view of the sixth exemplary embodiment of the installation unit according to the invention, in the direction of the arrow B in FIG. 32.
Figure 34:
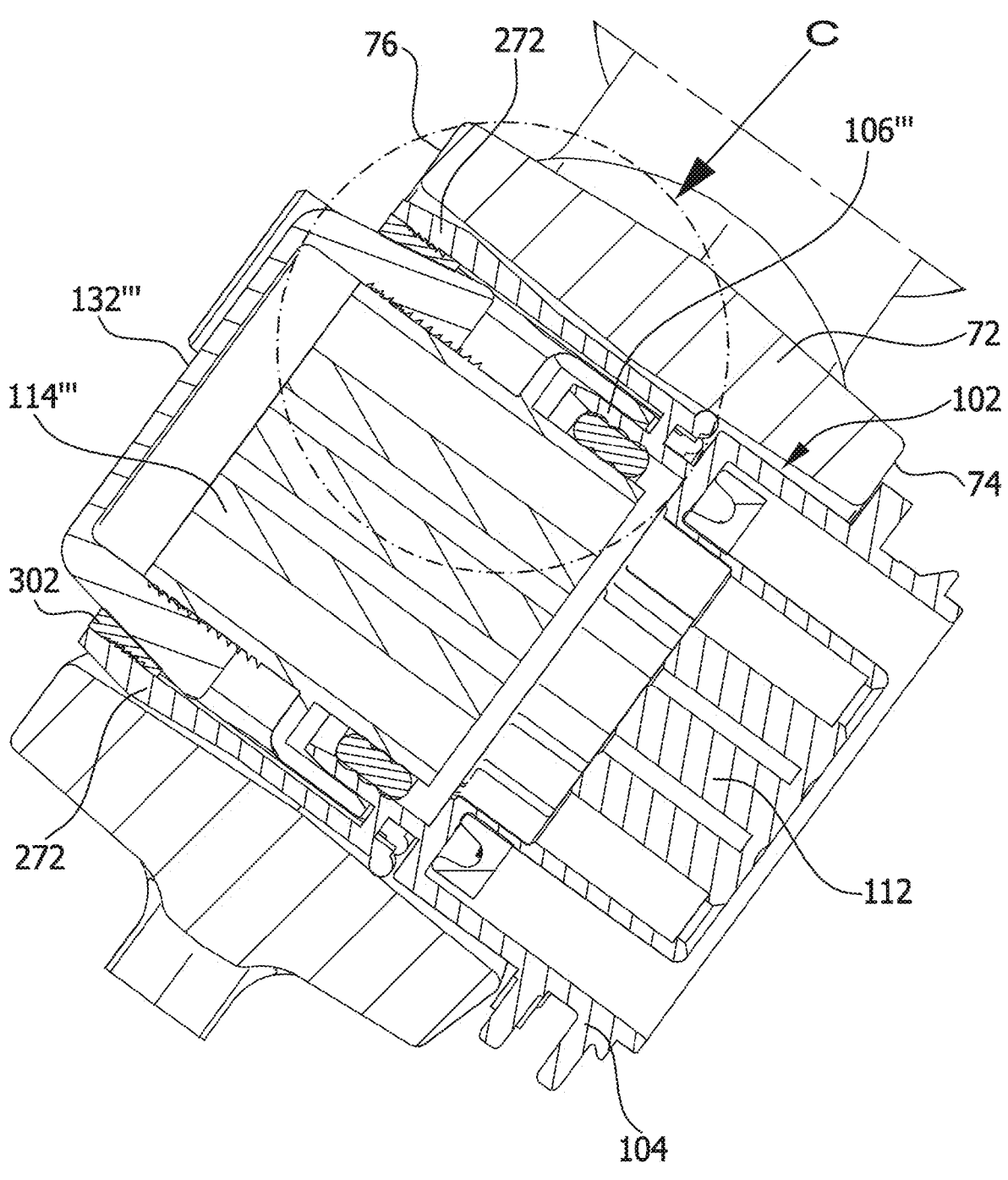
FIG. 34 shows a section, similar to FIG. 16, through a seventh exemplary embodiment of an installation unit according to the invention.
Figure 35:
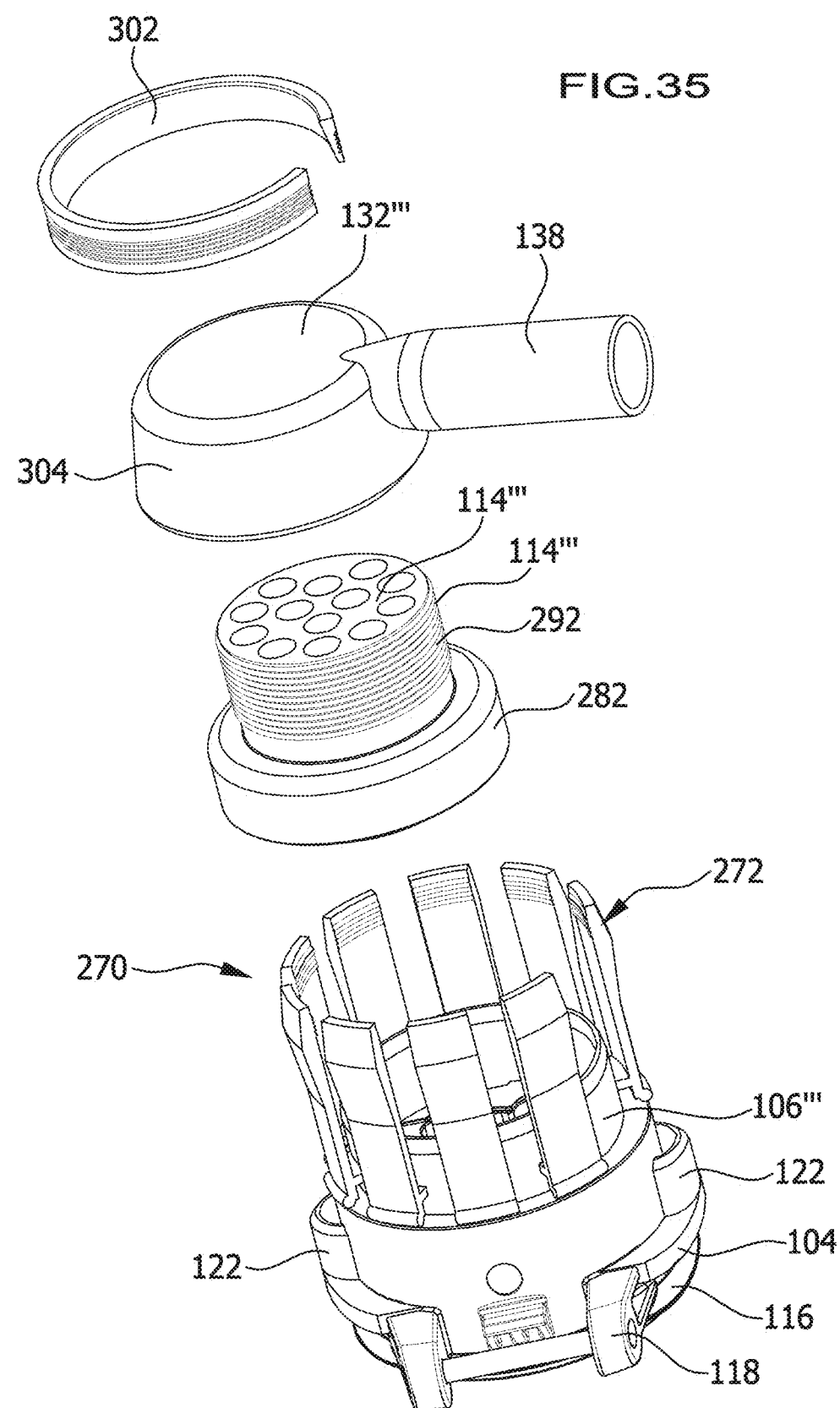
FIG. 35 shows a perspective exploded illustration of the seventh exemplary embodiment of the installation unit according to the invention.
Figure 36:
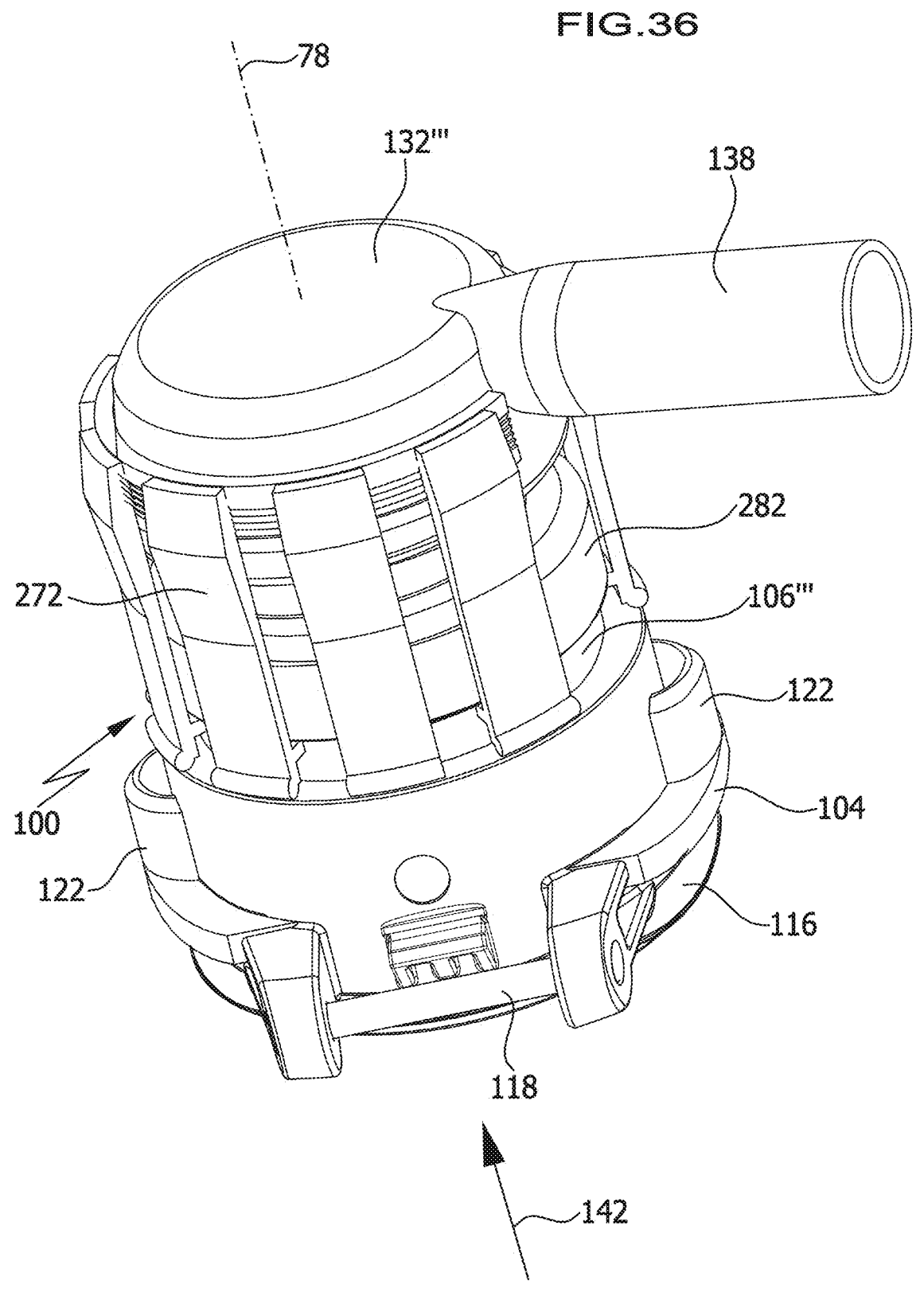
FIG. 36 shows a perspective illustration of the seventh exemplary embodiment of the installation unit according to the invention, in the assembled condition.
Figure 37:
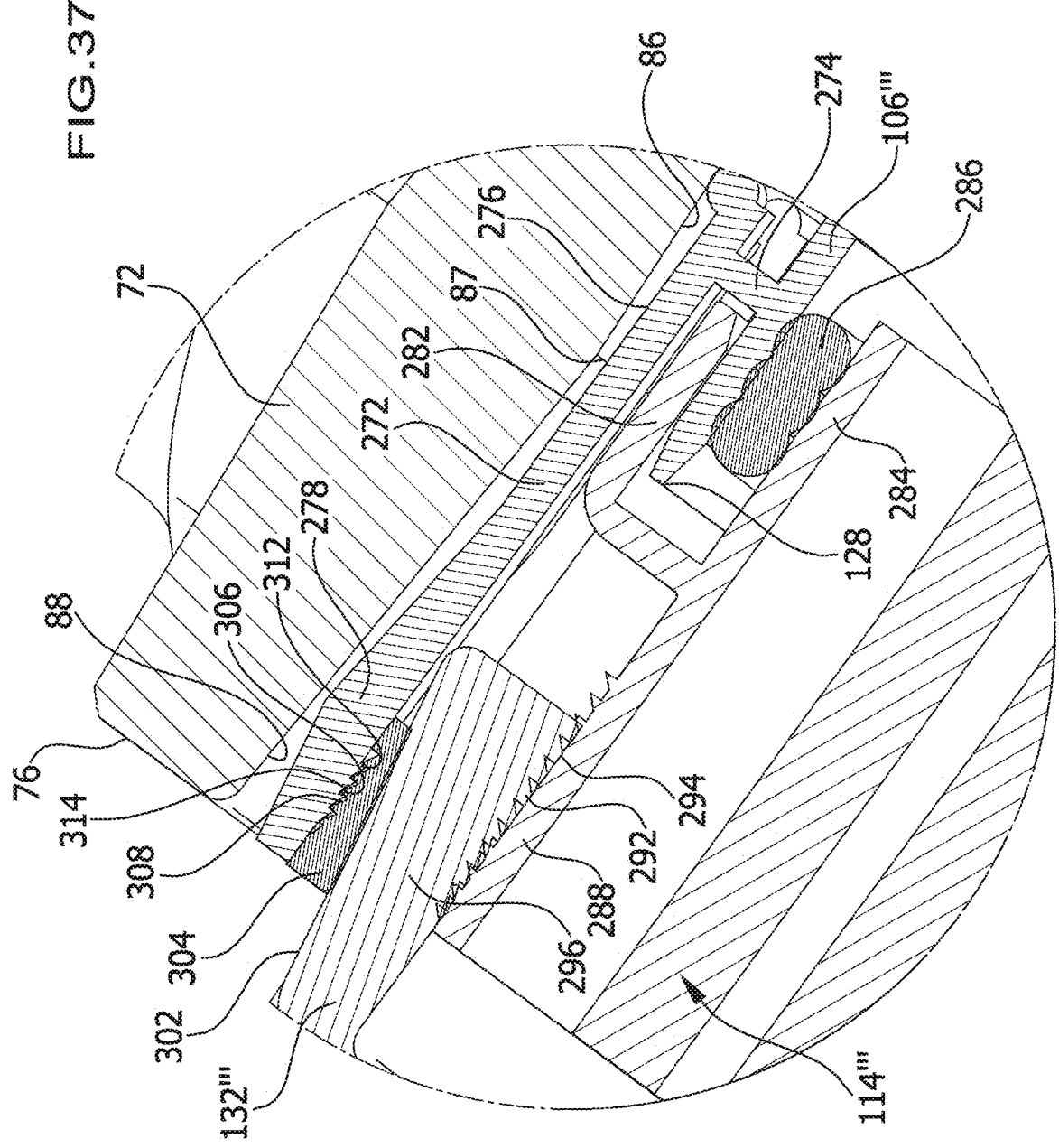
FIG. 37 shows an enlarged illustration of the region C in FIG. 34.

In a sixth exemplary embodiment, illustrated in FIGS. 31 to 33, in a modification of the fifth exemplary embodiment fixing projections 252 are integrally formed peripherally on the second housing portion 106 as a fixing unit 250 such that there is a complete ring 270 of fixing projections 252, which take the same form as in the fifth exemplary embodiment.

In contrast to the fifth exemplary embodiment, however, in the sixth exemplary embodiment it is provided for the support edges 258 of the fixing projections 252 to be arranged at different spacings from the first housing portion 104, wherein for example one or more of the fixing projections 252 is/are arranged with its/their support edge 258 at a defined spacing from the first housing portion 104 that is different from the defined spacing of the support edge 258 of other fixing elements 252.

Such an arrangement of the fixing projections 252, with support edges 258 at a different spacing from the first housing portion 104, thus enables a compensation for tolerance in respect of tolerances of the spacing between the step face 244 in the receptacle 72 and the first outer side 74 against which the first housing portion 104 abuts, wherein these tolerances are the result of the fact that the entire receptacle 72 and the receiving region 60 and thus also the step 242 with the step face 244 are manufactured as forged parts, which may result in tolerances in the spacing between the outer side 74 and the step face 244.

If the tolerances are within the range of the different spacings between the support edges 258 of the fixing projections 252 and the first housing portion 104, then there will always be fixing projections 252 that lie on or above the step face 244 and are thus able to move in the radial direction 24 into their original position as the housing 102 is inserted, and thus fix the housing 102 in the receptacle 72 substantially without play.

Detailed statements have not been made as regards the form taken by the closing-off cover 132. For example, the closing-off cover 132 may be provided with or without a cable feed 138.

In any case, the closing-off cover 132 closes off the access opening 128 to the second housing portion 106 in the same way as that described in the case of the first to third and fifth exemplary embodiments.

In a seventh exemplary embodiment, illustrated in FIGS. 34 to 37, elements that are identical to those of the exemplary embodiments above are likewise provided with the same reference numerals, so reference may likewise be made to the statements relating to all the exemplary embodiments above.

In contrast to the exemplary embodiments above, in the case of the seventh exemplary embodiment the second housing portion 106''' takes a form such that there are integrally formed thereon, on its outer side, as the fixing unit 270 at least two, preferably more, fixing tabs 272 that are arranged for example in a ring and extend along an outer side 276 of the second housing portion 106''' and where appropriate beyond it.

The fixing tabs 272 are connected, for example by way of a holding web 274, to the second housing portion 106, and extend, for example at a spacing from the outer side 276 of the second housing portion 106, beyond the access opening 128 as far as end regions 278 that are formed in a wedge shape.

In this exemplary embodiment, however, the line connector element 114''' is not arranged in the housing interior 108 of the second housing portion 106''' but is configured to be placed on the second housing portion 106''', with a cylindrical guide body 282 surrounding the outer side 276 of the second housing portion 106''', wherein the guide body 282 extends in particular substantially as far as the holding webs 274 of the fixing tabs 270 and guides the line connector element 114''', which at the same time extends through the access opening 128 to the second housing portion 106 and into this by means of a cylindrical attachment 284, such that a sealing element 286 for providing sealing closure is insertable between the cylindrical attachment 284 and an inner face of the second housing portion 106'''.

Moreover, in a region 288 lying close to the second outer side 76, the line connector element 114''' forms latching faces 292 onto which the closing-off cover 132''' is configured to be placed and by means of which the closing-off cover 132''' is latchable to an inner face 294 of its cylindrical attachment 136.

For the purpose of spreading the wedge-shaped end regions 278 of the fixing tabs 272, there is insertable between the wall faces 296 of the cylindrical attachment 136 of the closing-off cover 132''', which are latchable to the latching contours 292, and the wedge-shaped end regions 278 of the latching tabs 272 a wedge body 302, which on the one hand is supported against an outer side 304 of the wall faces 296 of the cylindrical attachment 136 of the closing-off cover 132''' and on the other acts on the wedge-shaped end regions 278 in order to cause these to abut under the action of force against the conically widening wall region 88, close to the second outer side 76 of the receiving region 60, and thus to fix the housing 102 such that it is prevented from detaching from the receptacle 72 by a movement counter to the direction of pushing in 142.

In order to fix the wedge body 302 in the position in which it wedges the fixing tabs 272, the fixing tabs 272 and the wedge body 302 are provided on their mutually abutting sides 306 and 308 with mutually engaging latching elements 312 and 314.

In this solution too, the installation unit 100 can be mounted simply and without play, despite manufacturing tolerances in the receiving region 60.

As regards all the other features, which are identical to those of the exemplary embodiments above, reference is further made to the statements relating to these exemplary embodiments above in their entirety.

The invention claimed is:

1. An installation unit for a carrier element of a carrier unit that is arranged on a body of a motor vehicle, comprising a housing having a first housing portion that, on a first outer side, is supported against a receiving region of the carrier element, and a second housing portion that engages in a receptacle of the receiving region of the carrier element, and a fixing unit that, when the installation unit is mounted in the receptacle, is supported against the receiving region, wherein, when the installation unit is fixed on the receiving region, the fixing unit is connected to the housing;

wherein the fixing unit comprises a multiplicity of fixing tabs that are held on the second housing portion; and wherein the fixing tabs are configured to be urged by a wedge body in the radial direction relative to a center axis of the second housing portion and thus to abut against the receiving region and to be wedged thereby.

2. The installation unit as claimed in claim 1, wherein there is arranged on the housing, at least one projection which engages in a recess that is arranged in the receiving region, and which fixes the housing in the receptacle such that it cannot rotate.

3. The installation unit as claimed in claim 1, wherein the at least one projection is integrally formed on the second housing portion in a manner adjoining the first housing portion.

4. The installation unit as claimed in claim 2, wherein there is arranged on the housing, a plurality of projections of which each engages in a recess arranged in the receiving region.

5. The installation unit as claimed in claim 1, wherein the housing is supported against the receiving region by the fixing unit to prevent movement counter to the direction of pushing in.

6. The installation unit as claimed in claim 1, wherein the bearing receptacles are arranged on the second housing portion.

7. The installation unit as claimed in claim 1, wherein the at least one projection is formed as one of the bearing receptacles.

8. The installation unit as claimed in claim 1, wherein the fixing tabs are integrally formed in one piece with the second housing portion.

9. The installation unit as claimed in claim 1, wherein the fixing tabs extend approximately parallel to the direction of pushing in.

10. The installation unit as claimed in claim 1, wherein the wedge body takes the form of an annular body.

11. The installation unit as claimed in claim 1, wherein the wedge body is supported and guided on a closing-off cover of the housing.

12. The installation unit as claimed in claim 1, wherein latching elements fix the wedge body in the position in which it urges the fixing tabs.

13. The installation unit as claimed in claim 1, wherein the wedge body is surrounded by the fixing tabs and extends axially from the fixing tabs toward a closing-off cover of the housing.

14. The installation unit as claimed in claim 1, wherein the fixing tabs comprise wedge-shaped end regions, and the wedge body is configured to act on the wedge-shaped end regions to urge the fixing tabs in a radial direction.

15. The installation unit as claimed in claim 1, wherein the fixing tabs are wedged toward a wall region of the receiving channel that widens conically in a direction toward a second outer side of the receiving region.

16. The installation unit as claimed in claim 1, wherein mutually engaging latching elements are provided on the wedge body and on the fixing tabs to secure the wedge body in a position urging the fixing tabs radially outward.

17. The installation unit as claimed in claim 1, wherein the fixing tabs are elongated cantilever fingers extending from a base portion in an annular array with gaps between adjacent elongated cantilever fingers to allow radial flexing, and the wedge body is a split ring to allow radial flexing.

18. The installation unit as claimed in claim 1, wherein the fixing tabs are connected by a holding web to the second housing portion and extend at a spacing from the outer side of the second housing portion beyond an access opening toward end regions that are formed in a wedge shape.

19. The installation unit as claimed in claim 1, wherein the fixing tabs are distributed circumferentially around the second housing portion.

20. The installation unit as claimed in claim 1, wherein a line connector element is arranged externally of the housing interior and is configured to be placed on the second housing portion, the line connector element comprising a cylindrical guide body surrounding an outer side of the second housing portion.

21. The installation unit as claimed in claim 20, wherein the cylindrical guide body extending substantially to holding webs of the fixing tabs and guiding the line connector element relative to the second housing portion.

22. The installation unit as claimed in claim 20, wherein the line connector element comprises a cylindrical attachment that extends through an access opening into the second housing portion, and wherein a sealing element is arranged between the cylindrical attachment and an inner face of the second housing portion to provide a sealing closure.

23. The installation unit as claimed in claim 1, wherein the fixing unit is connected to the second housing portion of the housing.

24. The installation unit as claimed in claim 1, wherein the fixing tabs are configured to abut against an inner wall of the receiving channel, and to be wedged thereby.

25. The installation unit as claimed in claim 1, wherein there is arranged on the second housing portion, at least one projection which engages in a recess that is arranged in the receiving region, and which fixes the housing in the receptacle such that it cannot rotate.

26. The installation unit as claimed in claim 1, wherein there is arranged on the second housing portion, a plurality of projections of which each engages in a recess arranged in the receiving region.

* * * * *